US009641909B2

(12) United States Patent
Des Jardins et al.

(10) Patent No.: US 9,641,909 B2
(45) **Date of Patent: *May 2, 2017**

(54) AUDIO/VIDEO ADVERTISING NETWORK

(71) Applicant: Advertising.com LLC, Dulles, VA (US)

(72) Inventors: G. Thomas Des Jardins, Alexandria, VA (US); David Markley, Gainesville, VA (US); Vinayak Raghuvamshi, Alexandria, VA (US); Thomas W. Macisaac, Bethesda, MD (US)

(73) Assignee: Advertising.com LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,966

(22) Filed: Jul. 17, 2015

(65) Prior Publication Data

US 2015/0326948 A1 Nov. 12, 2015

Related U.S. Application Data

(63) Continuation of application No. 11/390,461, filed on Mar. 28, 2006, now Pat. No. 9,104,669.

(60) Provisional application No. 60/665,364, filed on Mar. 28, 2005.

(51) Int. Cl.

| | |
|---|---|
| ***G06F 17/00*** | (2006.01) |
| ***H04N 21/81*** | (2011.01) |
| ***G06F 17/30*** | (2006.01) |
| ***H04N 21/234*** | (2011.01) |
| ***H04N 21/239*** | (2011.01) |
| ***H04N 21/24*** | (2011.01) |
| ***H04N 21/262*** | (2011.01) |
| ***H04N 21/2668*** | (2011.01) |
| ***H04N 21/658*** | (2011.01) |
| ***H04N 21/858*** | (2011.01) |

(52) U.S. Cl.

CPC ..... *H04N 21/812* (2013.01); *G06F 17/30017* (2013.01); *G06F 17/30029* (2013.01); *H04N 21/2393* (2013.01); *H04N 21/23424* (2013.01); *H04N 21/2407* (2013.01); *H04N 21/2668* (2013.01); *H04N 21/26258* (2013.01); *H04N 21/6581* (2013.01); *H04N 21/8586* (2013.01)

(58) Field of Classification Search

CPC .................................................... H04N 21/812

See application file for complete search history.

(56) References Cited

U.S. PATENT DOCUMENTS

| | | | |
|---|---|---|---|
| 6,160,548 | A | 12/2000 | Lea et al. |
| 6,502,076 | B1 | 12/2002 | Smith |
| 6,529,956 | B1 | 3/2003 | Smith et al. |
| 6,587,837 | B1 | 7/2003 | Spagna et al. |
| 7,076,478 | B2 | 7/2006 | O'Rourke et al. |
| 7,100,199 | B2 | 8/2006 | Ginter et al. |
| 2002/0065743 | A1 | 5/2002 | Bates et al. |

(Continued)

*Primary Examiner* — Mustafa Amin

(74) *Attorney, Agent, or Firm* — Finnegan, Henderson, Farabow, Garrett & Dunner, L.L.P.

(57) ABSTRACT

Owners of editorial video and/or audio content that is delivered over the Internet or other networks can enroll in an advertising affiliate network. Video and/or audio advertisements, or other marketing messages, are then delivered into the video and/or audio content when the content is accessed by a user. Bypassing of the advertising content may be prevented.

20 Claims, 16 Drawing Sheets

(56) References Cited

U.S. PATENT DOCUMENTS

| | | | | |
|---|---|---|---|---|
| 2002/0068525 | A1 | 6/2002 | Brown et al. | |
| 2002/0072967 | A1 | 6/2002 | Jacobs et al. | |
| 2002/0083178 | A1 | 6/2002 | Brothers | |
| 2003/0190044 | A1 | 10/2003 | Higashi et al. | |
| 2003/0208684 | A1 | 11/2003 | Camacho et al. | |
| 2004/0148424 | A1* | 7/2004 | Berkson | G06Q 30/02 709/236 |
| 2004/0199657 | A1 | 10/2004 | Eyal et al. | |
| 2005/0015807 | A1 | 1/2005 | Young | |
| 2005/0060229 | A1 | 3/2005 | Riedl et al. | |
| 2005/0080878 | A1 | 4/2005 | Cunningham et al. | |
| 2006/0010074 | A1 | 1/2006 | Zeitsiff et al. | |
| 2006/0013556 | A1 | 1/2006 | Poslinski | |
| 2006/0056324 | A1 | 3/2006 | Hyyppa et al. | |
| 2006/0075449 | A1 | 4/2006 | Jagadeesan et al. | |
| 2006/0147018 | A1 | 7/2006 | Gupta et al. | |
| 2007/0171903 | A1 | 7/2007 | Zeng et al. | |
| 2007/0186003 | A1 | 8/2007 | Foster et al. | |
| 2007/0271186 | A1 | 11/2007 | Kurihara et al. | |
| 2008/0201344 | A1 | 8/2008 | Levergood et al. | |
| 2010/0235743 | A1 | 9/2010 | Rahman et al. | |

* cited by examiner 302 304

| Category | Associated Template(s) |
|---|---|
| U.S. News | Template A |
| International News | Template A, Template B |
| Sports | Template B, Template C, Template D |
| NFL | Template E |
| NBA | Template D |
| Food | Template F |

```
<!-- BEGIN VIDEO TABLE -->
<table bgcolor="#ffffff" border="0" cellpadding="0" cellspacing="0" width="700">
  <tbody><tr>
    <td colspan="2" height="14"><script src="lcSyncBanner.js" language="javascript" type="text/javascript"></script>
  </tr>
  <tr>
    <td class="video_td" width="354">
      <div class="video_caption">If this is adult material, <a href="http://symetrix.dyndns.org/nasignup/rateAdult.jsp?nwid=7370">click here</a>.</div>
<!--<img id="video_placeholder" name="g_video_placeholder.gif" />-->
<div id="MediaPlayerDiv"><embed type="application/x-mplayer2"
src="http://web.lightningcast.com/servlets/getPlaylist?ver=2.0&guid=GUID&nwid=7370&audit=param&brand=&level=FOOD%3A%20SHOW_IA_THE_SERIES&content
=http%3A//wms.scripps.com/foodtv/ironchefamerica/ica-judging.wmv&responseType=ASX&mswmext=.asx;" height="300"
width="320"><param name="AUTOSTART" value="TRUE"><param name="uiMode" value="full"></div>
<!-- end video -->

      <td width="346"><br><center>Advertisement
getAssociatedContent?ver=2.0&guid=GUID&nwid=7370&audit=param&brand=&level=FOOD%3A%20SHOW_IA_THE_SERIE
    </td>
  </tr>
  <tr>
  </tr>
</tbody></table>
```

FIG. 6

AUDIO/VIDEO ADVERTISING NETWORK

CLAIM OF PRIORITY

This application is a continuation of U.S. patent application Ser. No. 11/390,461, filed Mar. 28, 2006 (now allowed), which claims priority to U.S. Provisional Application No. 60/665,364, filed Mar. 28, 2005. Each of the above applications is expressly incorporated herein by reference to their entireties.

TECHNICAL FIELD

This disclosure relates generally to an audio/video advertising affiliate network.

BACKGROUND

Video and/or audio content is increasingly being delivered across the Internet and presented to users by a media player. The media player may operate to present such content in at least two general ways. First, the media player can begin playing the content while the content is sent over the network. This is generally referred to as streaming, and the associated content may generally be referred to as streaming content. Streaming content may present certain advantages to the end-users, such as reducing the time between the content's selection and display and removing the need for client-side storage of media files.

Streaming content typically falls into two general categories: broadcast and on-demand. To a streaming server, a broadcast source is usually any external video or audio feed, such as a television or radio station, whereas an on-demand source is usually a multimedia file chosen by the user.

Broadcast streams are generally entered "in progress" by users. Each client connects to a single "pushed" stream so all clients experience the same portion of the media at the same time. On-demand streams are generally discrete "pulled" multimedia segments, such as individual songs or video clips that are delivered to each client upon request. Each client starts at the beginning of the clip.

Second, as an alternative to streaming, the content may be completely downloaded in advance of play by the media player. The content associated with this method of operation may generally be referred to as downloaded content. The download approach may allow for delivery of higher-definition content than what the user's network connection might otherwise support when streaming, and may allow for offline viewing of content. Additionally, allowing the user to download high-definition content in advance of play may reduce the content publisher's reliance on more expensive streaming technologies.

This available content creates video and/or audio advertising inventory. In other words, the available video and/or audio content creates opportunities for the insertion of video and/or audio advertising content. Advertising content is generally any other content besides the editorial or programming content (which is the content the user desires to have presented), and is typically content that promotes particular services or goods. Advertising content may be, for example, previews for editorial content being offered in the future (referred to as "previews"), an indication of the source of programming content (referred to as "branding"), or promotions to buy or otherwise acquire specific products or services (referred to as "advertisements"). Specific examples of such advertising content include channel ids, notification of upcoming programming in the playlist, and cross-promotions of similar editorial content.

The editorial video and/or audio content being made available on the Internet (and through other packet-based networks), however, is typically being provided by a number of independent publishers of content and, generally, as a result, the potential advertising inventory is generally fragmented and there is little or no management of this inventory. In other words, while the delivery of editorial video and/or audio content across the Internet by different publishers produces video and audio advertising inventory, that inventory is generally fragmented and unmanaged. This means that advertisers that want to use this advertising inventory may have difficulties in obtaining access to this inventory, and to the extent that they can, they may have little control over the delivery of their ad campaigns in terms of targeting, frequency capping, session management, ad unit standardization and other requirements. In addition, any reporting they receive back may be equally limited.

SUMMARY

In general, systems and techniques are described for implementing an advertising affiliate network that may allow for the aggregation of editorial content from independent publishers, and which may allow the resulting inventory to be uniformly managed. In one implementation, independent publishers are enrolled in the advertising affiliate network and, during enrollment, an advertising system dynamically generates code tailored to the affiliate, to assist the affiliate in integrating its website into the ad affiliate network. In addition, the system may verify the operation of the code before the affiliate integrates the code into the affiliate's website. The advertising system delivers video and/or audio advertising content, such as advertisements and other marketing messages, into the editorial audio or video content when the editorial content is accessed by a user. The advertising content inserted may be based on a default template or specific template, which may or may not be associated with a category of the editorial audio or video content. The template describes the desired media/advertising experience. The system also may tune the templates by, for example, adjusting the ratio of advertising content to editorial content based on metrics obtained from auditing messages, and may limit bypassing of the desired advertising experience, effectively requiring end users to watch both the editorial content and the advertising content.

More generally, in one aspect, a process includes receiving a request for editorial video or audio content is received from a client system. The client system uses a uniform resource locator to generate the request. The process also includes determining whether the uniform resource locator used by the client system to generate the request was obtained by the client system from a playlist provided to the client system by a playlist server. Playlists provided by the playlist server include one or more uniform resource locators for advertising video or audio content and one or more uniform resource locators for editorial video or audio content. If the uniform resource locator used by the client system to generate the request was obtained by the client system from a playlist provided by the playlist server, the process includes sending the requested editorial video or audio content to the client system. On the other hand, if the uniform resource locator used by the client system to generate the request was not obtained by the client system from a playlist provided by the playlist server, the process includes denying the client system access to the requested editorial video or audio content.

Implementations may include one or more of the following features. For example, determining whether the uniform resource locator used by the client system to generate the request was obtained by the client system from a playlist provided to the client system by a playlist server may include sending a playlist status request to the playlist server; and receiving a response to the playlist status request from the playlist server, wherein the response from the playlist server indicates whether a previous item in a playlist has been presented by the client system. Determining whether the uniform resource locator used by the client system to generate the request was obtained by the client system from a playlist provided to the client system by a playlist server may alternatively, or additionally, include generating a dynamic uniform resource locator for the requested editorial video or audio content; and verifying that the uniform resource locator used by the client system to generate the request is the dynamic uniform resource locator. Also, determining whether the uniform resource locator used by the client system to generate the request was obtained by the client system from a playlist provided to the client system by a playlist server may alternative, or additionally, include determining that the uniform resource locator used by the client system to generate the request includes a key value generated by the playlist server; and determining whether the included key value is valid. Determining whether the included key value is valid may include generating a hash value based on the uniform resource locator used by the client system to generate the request; combining the hash value with the included key value and a shared key value to generate a time value; and determining whether the generated time value is within a time threshold.

In another aspect, a system includes a playlist server and an affiliate media server. The playlist server is configured to provide playlists to client systems. The playlists include one or more uniform resource locators for advertising video or audio content and one or more uniform resource locators for editorial video or audio content. The affiliate media server is configured to receive, from a client system, a request for editorial video or audio content, wherein the client system uses a uniform resource locator to generate the request; and verify that the uniform resource locator used by the client system to generate the request was obtained by the client system from a playlist provided to the client system by the playlist server. The affiliate media server is also configured to send the requested editorial video or audio content to the client system in response to verifying that the uniform resource locator used by the client system to generate the request was obtained by the client system from a playlist provided to the client system by the playlist server.

Implementations may include one or more of the following features. For example, to determine whether the uniform resource locator used by the client system to generate the request was obtained by the client system from a playlist provided to the client system by a playlist server, the affiliate media server may be configured to send a playlist status request to the playlist server; and receive a response to the playlist status request from the playlist server, wherein the response from the playlist server indicates whether a previous item in a playlist has been presented by the client system. Additionally, or alternatively, to determine whether the uniform resource locator used by the client system to generate the request was obtained by the client system from a playlist provided to the client system by a playlist server, the affiliate media server may be configured to generate a dynamic uniform resource locator for the requested editorial video or audio content; and verify that the uniform resource locator used by the client system to generate the request is the dynamic uniform resource locator. Also, to determine whether the uniform resource locator used by the client system to generate the request was obtained by the client system from a playlist provided to the client system by a playlist server, the affiliate media server may be additionally, or alternatively, configured to determine that the uniform resource locator used by the client system to generate the request includes a key value generated by the playlist server; and determine whether the included key value is valid. To determine whether the included key value is valid, the affiliate media server may be configured to generate a hash value based on the uniform resource locator used by the client system to generate the request; combine the hash value with the included key value and a shared key value to generate a time value; and determine whether the generated time value is within a time threshold.

In another aspect, a request for a playlist is received from a client system. The request includes an identifier of editorial video or audio content to be presented by the client system. A content key and a playlist identifier of the editorial video or audio content are generated. The playlist identifier includes the content key The playlist is also generated and sent to the client system. The playlist includes the playlist identifier of the editorial video or audio content and one or more identifiers of advertising video or audio content to be presented to the client system in addition to the editorial video or audio content. A request for the editorial video or audio content is received from the clients system. To generate the request, the client system uses the playlist identifier of the editorial video or audio content such that the request for the editorial video or audio content includes the content key. The included content key is verified as valid and the requested editorial video or audio content is sent to the client system in response to verifying that the included content key is valid.

Implementations may include one or more of the following features. For example, generating the content key may include generating a hash value based on the identifier of the editorial video or audio content included in the request for the playlist; and combining the hash value with a shared key and a first time to generate the content key. Verifying that the included content key is valid may include generating a hash value based on the identifier of the editorial video or audio content included in the request for the playlist; combining the hash value with the shared key and the content key to obtain the first time; and determining whether the obtained first time is within a predetermined amount of a second time. The first time may be the time at which the request for the playlist is received; and the second time may be the time at which the request for the editorial video or audio content is received.

The identifier of the editorial video or audio content in the request for the playlist may include a uniform resource locator for the editorial video or audio content; and generating the playlist identifier of the editorial video or audio content may include appending the content key to the uniform resource locator for the editorial video or audio content. Additionally, or alternatively, the identifier of the editorial video or audio content in the request for the playlist may include a unique content identification value; and generating the playlist identifier of the editorial video or audio content may include determining a uniform resource locator for the editorial video or audio content based on the unique content identification value and appending the content key to the uniform resource locator for the editorial video or audio content.

In general, implementations of the described techniques may include hardware, a method or process, and computer software on a computer-accessible medium.

The details of one or more implementations are set forth in the accompanying drawings and the description below. Other features will be apparent from the description and drawings, and from the claims.

DESCRIPTION OF DRAWINGS

FIG. 6 shows an example of code that may be generated for a piece of content registered by an affiliate.

DETAILED DESCRIPTION

In general, the following discussion describes systems and techniques for implementing an advertising affiliate network. Owners of editorial video and/or audio content that is delivered over the Internet or other networks can enroll in the advertising affiliate network. Video and/or audio advertisements, or other marketing messages, are then delivered into the video and/or audio editorial content when the content is accessed by a user. The systems and techniques may allow for the advertising inventory created by independent publishers of editorial content to be aggregated and may allow for the aggregated inventory to be well-managed by controlling the entire editorial experience from ads to content and by providing a central mechanism for campaign allocation.

For example, in one implementation, a content provider may enroll with the system as an affiliate and during enrollment map its audio or video content to one or more categories and/or templates. During enrollment, the system generates code that the affiliate uses in its website in place of the URL that directly references the affiliate's audio or video content. The system then verifies that the code properly integrates the advertising or other marketing messages with the affiliate's content. When the affiliate's audio or video content is selected by an end-user, the code sends a request to a playlist server for a playlist, rather than connecting directly to the affiliate's audio or video content. This request includes information about the selected content, such as a category of the content or an identification of the content. When the playlist server gets the request, an appropriate template is located based on the category of the content. The template is used to select advertising and other marketing content and to form a playlist that includes the advertising and other marketing content along with the affiliate's content that the end-user selected.

The templates define the amount of advertisements or other marketing messages to be included with the editorial content, along with their placement relative to the editorial content, in an integrated fashion. Thus, the playlists generated from the templates may form a complete experience that is editorially intact, and that meets advertising challenges of the advertisers.

In addition, in some implementations, direct access to the editorial content of an affiliate by end users may be prevented. In other words, the system may operate to prevent access to the content without first requesting a playlist from the system. This may prevent end-users from bypassing the media experience, including any advertising and marketing messages defined by the template.

System Overview

Figure 1:
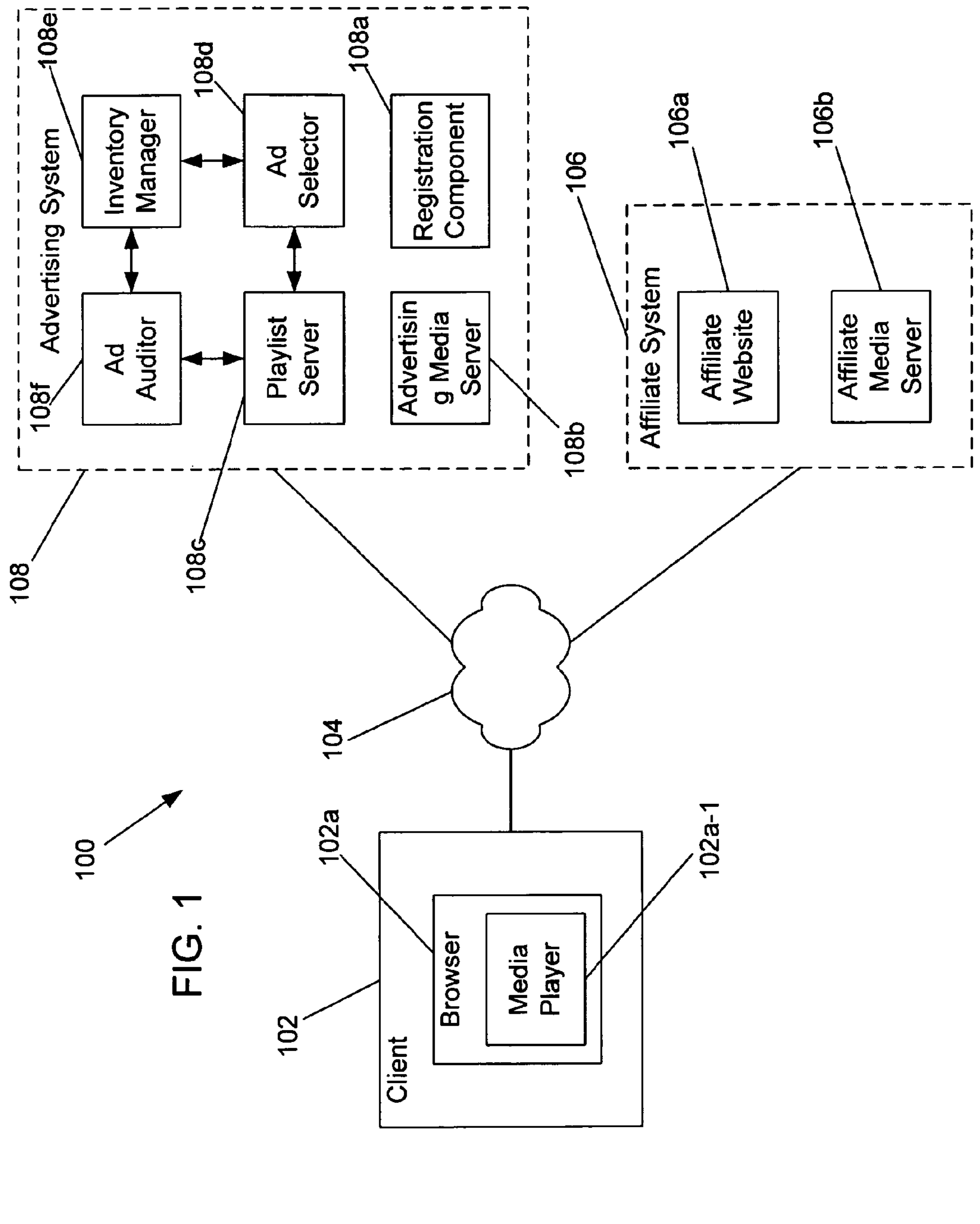
FIG. 1 is a block diagram illustrating an example of a system for implementing an advertising affiliate network in an Internet environment.

Referring to FIG. 1, an example of a system 100 for implementing an advertising affiliate network in an Internet environment is shown. The system 100 may support streaming content and/or downloaded content, and includes a client system 102, the Internet 104, an affiliate system 106, and an advertising system 108.

The client system 102 or server systems 106 and 108 may be implemented using, for example, a general-purpose computer, a personal computer (PC), a special-purpose computer, a workstation, a server, a personal video recorder, a media center PC, a device, a component, or other equipment or some combination thereof capable of responding to and executing instructions. These components may receive instructions from, for example, a software application, a program, a piece of code, a device, a computer, a computer system, or a combination thereof, which independently or collectively direct operations, as described herein.

In general, the client system 102, the affiliate system 106, and the advertising system 108 can communicate with one another over the Internet 104. While network 104 is described as the Internet, network 104 more generally is a packet-based network and may include Wide Area Networks (WANs), Local Area Networks (LANs), analog or digital wired and wireless telephone networks (for example, a Public Switched Telephone Network (PSTN), an Integrated Services Digital Network (ISDN), or a Digital Subscriber Line (xDSL)), or any other wired or wireless network including, for example, a corporate LAN. Network 104 may include multiple networks or subnetworks, each of which may include, for example, a wired or wireless data pathway.

The affiliate system 106 generally makes available editorial video and/or audio content to a user of, for example, client system 102. Affiliate system 106 includes an affiliate website 106*a* and an affiliate media server 106*b*. The affiliate website provides access to, for example, Hypertext Markup Language (HTML) based web pages. These webpages allow a user of client system 102 to select editorial video and/or audio content for presentation on the client system 102.

The affiliate media server 106*b* stores the available editorial video and/or audio content. In addition, in some implementations, the affiliate media server 106*b* uses mechanisms implemented in system 100 to prevent client systems from directly accessing the editorial content. In other words, the affiliate media server 106*b* uses the mechanisms to insure that the client systems are accessing the editorial content using a playlist provided by playlist server 108*c*, rather than accessing the editorial content directly. In general, in such an implementation, when the affiliate media server 106*b* receives a request for editorial content from a client system, it uses the mechanisms to verify that the URL used by the client system to request the editorial content was obtained by the client system from a current playlist provided by playlist server 108*c*, instead of from somewhere else (e.g., a search engine). Enabling the affiliate media server 106*b* to verify the URL was obtained from a current playlist may prevent end users from bypassing the media experience, including any advertising and marketing messages. Techniques for accomplishing this are described below with respect to FIGS. 9A-11B.

The client system 102 executes a web browser 102*a* that may be used to access the web pages available from affiliate website 106*a*. Thus, a user of client system 102 may use browser 102*a* to browse the webpages provided by affiliate website 106*a*. Some of those webpages contain selections of the editorial video and/or audio content available from affiliate media server 106*b*. A media player application 102*a*-1 is embedded in one or more of those webpages and used to present the editorial video and/or audio content, along with other content such as advertising video and/or audio content. Windows Media® Player from Microsoft Corporation and the RealPlayer® from RealNetworks, Inc. are examples of media players that may be embedded in the webpages.

The advertising system 108 is a hosted platform for enrolling affiliates (such as affiliate 106) and for managing, selecting, and inserting advertising and marketing messages into or around editorial content of the affiliates. In general, the advertising system 108 manages the advertising inventory produced by registered affiliates according to categories of editorial content, such that affiliates register their content in particular categories, advertising campaigns are allocated against categories of editorial content, and the overall user experience is defined on a per category basis. Other implementations may use other logical groupings of editorial content to manage the advertising inventory and user experience.

The advertising system 108 includes a registration component 108*a*, an advertising media server 108*b*, a playlist server 108*c*, an ad selector 108*d*, an inventory manager 108*e*, and an ad auditor 108*f*. These components generally allow the advertising system 108 to perform various functions, such as: (1) Registration of affiliate systems; (2) Planning, creation, and management of targeted advertising campaigns (campaign management); (3) Selecting advertising content for insertion within and around content; (4) Managing the end-user experience: the type and sequence of message delivery (experience management); and (5) Business intelligence: campaign performance analysis, audience analytics, and confirming and counting ad deliveries.

The registration component 108*a* enables the registration of independent publishers of editorial video and/or audio content (such as affiliate system 106) into the advertising affiliate network. An independent publisher uses the registration component to register their website 106*a*, their editorial video and/or audio content, and pertinent information regarding the content (as described further below).

The inventory manager 108*e* enables campaign management by allowing advertising operations managers to specify, for example, business rules associated with an advertising campaign. The business rules regarding an advertising campaign generally define the parameters under which the associated advertising content should be presented, such as one or more content categories of the editorial content, the timing that the advertising content should be presented (for example, at night or mid-afternoon), the percentage of the population to whom the advertising media should be presented, the frequency with which the advertising media should be presented, the number of times the associated advertising content should be presented in a period of time, and/or the geographic location(s) of the users to whom the advertising media should be presented. The inventory manager 108*e* also may provide for advertising inventory forecasting and reservation. Techniques and a system for defining campaign business rules, as well as performing advertising forecasting, is described in U.S. application Ser. No. 11/088,262, titled "Managing Advertising Inventory," filed on Mar. 24, 2005, and incorporated herein by reference.

The ad selector 108*d* selects particular pieces of advertising content based on the campaign business rules and information contained in requests to the playlist server 108*c* for playlists.

The playlist server 108*c* enables experience management by allowing advertising operations managers to specify, for example, business rules associated with the overall user experience, such as the amount of advertising content (e.g., a ratio of advertising content presented to editorial content presented or an absolute amount of advertising content), what type of advertising content is presented (e.g., branding, advertisements, preview), and the order that advertising content and editorial content is presented. In general, when the playlist server 108*c* receives a request for a playlist from a client system, such as client system 102, the playlist server uses the user experience business rules to determine what type(s) of advertising content should be included in the playlist, to request selection of particular pieces of advertising content of the appropriate types from the ad selector 108*d*, and to form a playlist including the selected advertising content and the editorial content. Thus, the advertising system 108, rather than the affiliate system, defines the type, placement, and amount of advertising content. In this way, each playlist, and the associated elements, both HTML and full screen, may form a complete experience that is editorially intact, meets the advertising needs of advertisers, and is relevant to the client at that point in time.

In the advertising system 108 shown, the user experience business rules are maintained by the playlist server 108*c* as templates. The templates describe the user experience business rules, such as the order and types of advertising or other marketing content that should be shown with the editorial content, possibly as well as any elements (for example, banner ads) to be shown in a surrounding HTML page. For example, a template may indicate that an advertisement is to be shown first and then the editorial content is to be shown.

The templates in system 108 are associated with one or more categories of editorial content. For example, advertising system 108 may maintain a sports category, with a football category and soccer category underneath the sports category. A single template may be associated with each category, or there may be different templates associated with each category. In some cases, there may be more than one template associated with a category, and the affiliate may be given the ability to select one of the templates when it enrolls. Alternatively, or additionally, multiple templates for a category may be chained together (as described further below with respect to FIG. 3) such that one template is used for a certain number of requests from a particular client system, and then the next template in the chain is used. Techniques and a system for defining user experience business rules is described in U.S. application Ser. No. 11/023,638, titled "Advertising Content Delivery," filed on Dec. 29, 2004, and incorporated herein by reference.

In one implementation, the template(s) associated with a particular category are used for all affiliate content. That is, the advertising operations managers create a template for a category, and template is applied across all affiliates for content in the category. In such an implementation, when a request for a playlist is received, a template associated with the category of the editorial content is used by the playlist server 108*c* in forming the playlist. Thus, if a request for football content from a first affiliate's website is received, the football template is used and, if a request for football content from a second affiliate's website is received, the same football template is used.

In other implementations, however, the template created by the advertising operations manager for a category is a default template that is initially used when an affiliate registers. Over time, the template is adjusted by the playlist server 108*c* such that the template is specific for a particular affiliate. In other words, a default template is initially associated with and used for content in a particular category, but that default template is adjusted or tuned during system operation so that it becomes specific to the particular affiliate. In such an implementation, when a request for a playlist is received, a template associated with both the category of the editorial content and the particular affiliate is used by the playlist server 108*c* in forming the playlist. Thus, if a request for football content from a first affiliate's website is received, the football template associated with the first affiliate is used while, on the other hand, if a request for football content from a second affiliate's website is received, the football template associated with the second affiliate is used.

In particular, in one implementation, auditing messages (described below with respect to ad auditor 108*f*) are used to obtain information about the tolerance of an affiliate's audience for advertising content. The ratio of advertising content to editorial content defined in the default template is then adjusted to better approximate the tolerance of the affiliate's audience for advertising content. In general, audience members have a particular tolerance for the amount of advertising they will accept before they discontinue consuming editorial content from a source.

In such an implementation, the auditing messages include information about the user's behavior when advertising and/or editorial content is presented, and from this information, audience drop-off rates can be measured. This drop-off rate can then be fed back to adjust the amount of the advertising content to be provided in general on subsequent requests for content.

Additionally, or alternatively, the auditing messages may be used to obtain an estimate of the number of audience members during one or more periods of time. This information may then be used to adjust the ratio of advertising content to editorial content on a time specific basis. In general, the higher the number of audience members during a time period, the higher the ratio can be set for that the time period and vice versa. This may be particularly true for streaming content that is provided only during a certain time period because the higher audience number may indicate a higher popularity of the content. This may more generally be true (and therefore applicable, for example, to on-demand content) because the higher number of audience members may mean that the average tolerance for the time period is higher. An example of this might be advertising into sports content at a time when sports are popular such as on Superbowl Sunday. Advertising at that time might be more tolerated than at other times.

In some implementations, an affiliate may be allowed to estimate its audience's tolerance for advertising content (e.g., by providing a suggested spot load or ratio of advertising content to editorial content) either during enrollment or when registering a particular piece of content, and this initial estimate is then used initially in the default template(s). Then, as audience metrics are collected through auditing messages, the playlist server 108*c* tunes the template(s) so that the ratio of advertising content to editorial content is optimal in terms of reduced audience drop-off rates. In other implementations, additional information can be taken into account when tuning the amount of advertising, such as, for example, other metadata about the content or site, RSS or ATOM syndication information, MP3 tags, the number of referring links, or the audience levels for the site as a whole or for a subgroup of the site. By this mechanism, an imprecise estimate of an audience's tolerance for advertising content may be initially used, but it is then adjusted to better align the spot load to the audience's actual tolerance, allowing advertising goals to be more closely accomplished.

Ad auditor 108*f* enables business intelligence by providing advertising operations managers insight into, for example, the campaign performance, audience metrics, and audience behavior. Ad auditor 108*f* also may provide advertisers with information about which ads were actually delivered to users, along with information about the user's actions while the advertising content was presented. To enable such functions, the client systems (such as client system 102) may send auditing messages for presented advertising content to the ad auditor 108*f* (and may send auditing messages for presented editorial content as well). In general, the auditing messages indicate that a particular piece of advertising content (or editorial content) was presented to the user, and may indicate the user's behavior while the advertising content (or editorial content) was being presented (e.g., whether the browser 102 was minimized, whether the user paused the media player 102*a*-1, or whether the media player 102*a*-1 was in full screen mode). The auditing messages also may contain other information. For example, when advertising content is being audited, the auditing message may include the category of the editorial content associated with the advertising content being audited, an identifier of the associated editorial content, and the time that the advertising content is being presented. When editorial content is being audited, the auditing message may include the category of the editorial content presented, an identifier of the editorial content, and the time the editorial content was presented. The auditing messages may contain a unique identifier for the user, such as a globally unique identifier (GUID).

This information may be used to insure advertisers are properly billed, and affiliates are properly paid, for advertising content that is actually presented to the end-user. This information also may be used to understand an affiliate's audience to tune the template used for an affiliate as described above and/or to determine the effectiveness of an individual creative (that is, a particular piece of advertising content) as well. Auditing messages and techniques related to auditing messages are described in U.S. application Ser. No. 11/023,631, titled "Auditing of Content Related Events," filed on Dec. 29, 2004, and incorporated herein by reference.

Generally, a user of client system 102 uses browser 102*a* to access a webpage from affiliate website 106*a*. The webpage includes one or more selections of editorial content available from affiliate media server 106*b*. When the user selects a piece of editorial content, the affiliate website sends a webpage to browser 102_a_ that includes the embedded media player 102_a_-1 and code for causing the embedded media player 102_a_-1 to send a request for a playlists to playlist server 108_c_. The request includes information such as an identifier of the selected content (e.g., a uniform resource locator (URL) for the content or a unique content identification value), a category of the selected editorial content, and an affiliate id (which uniquely identifies affiliate system 106) and a unique identifier of the client system 102 (e.g., a GUID). When the playlist server 108_c_ receives the request, the playlist server 108_c_ determines the appropriate template based on the category, and/or based on other parameters such as the particular affiliate id (e.g., if default templates are tuned on a per-affiliate basis) and/or the GUID (e.g., if multiple templates are chained together). For example, the content category may be "football." So, when the request is received, a template associated with the football category is selected. If there is more than one template for the football category, then the one the affiliate selected when he or she registered may be selected. Alternatively, or additionally, the affiliate id may be used to select a football template that has been tuned to be specific to the affiliate and/or the GUID may also be used to select the appropriate template in a chain of templates for the category. The affiliate id is also used for tracking which advertising content and the amount of advertising content that is shown with the affiliate's editorial content so that the affiliate can be appropriately paid a portion of the advertising revenue.

The playlist server 108_c_ uses the selected the template to determine the type (e.g., advertisements, branding, or previews) and other parameters (e.g., length) of advertising video and/or audio content to include in the playlist. The playlists server 108_c_ then sends a request to ad selector 108_d_ to select particular pieces of advertising video/or audio content that meet the type and other parameters of advertising content needed. The ad selector 108_d_ then selects the particular pieces of advertising video and/or audio content and returns a URL or other identifier for the selected pieces. The playlists server 108_c_ then generates the playlist, which includes the URL(s) of any advertising content, and the URL(s) of the editorial content. The playlist server 108_c_ then sends the playlist to the media player 102_a_-1.

The media player 102_a_-1 then presents the advertising and editorial content according to the playlist. The media player 102_a_-1 does so by accessing the advertising content from advertising media server 108_b_ and the editorial content from affiliate media server 106_b_. Also, before, after, or during the presentation of advertising and/or editorial content, the media player 102_a_-1 sends auditing messages to ad auditor 108_f_. These auditing messages are then used to compile campaign or audience metrics and/or to tune one or more templates associated with the affiliate.

In some implementations, direct access to the editorial content of an affiliate by a media player may be prevented. In other words, the mechanisms may be implemented in system 100 to prevent the client system 102 from accessing the editorial content without first requesting a playlist from the playlist server 108_c_. This may prevent end users from bypassing the media experience, including any advertising and marketing messages defined by the template. Techniques for doing so are described further below with respect to FIGS. 9A-11B.

Figures 2, 3:
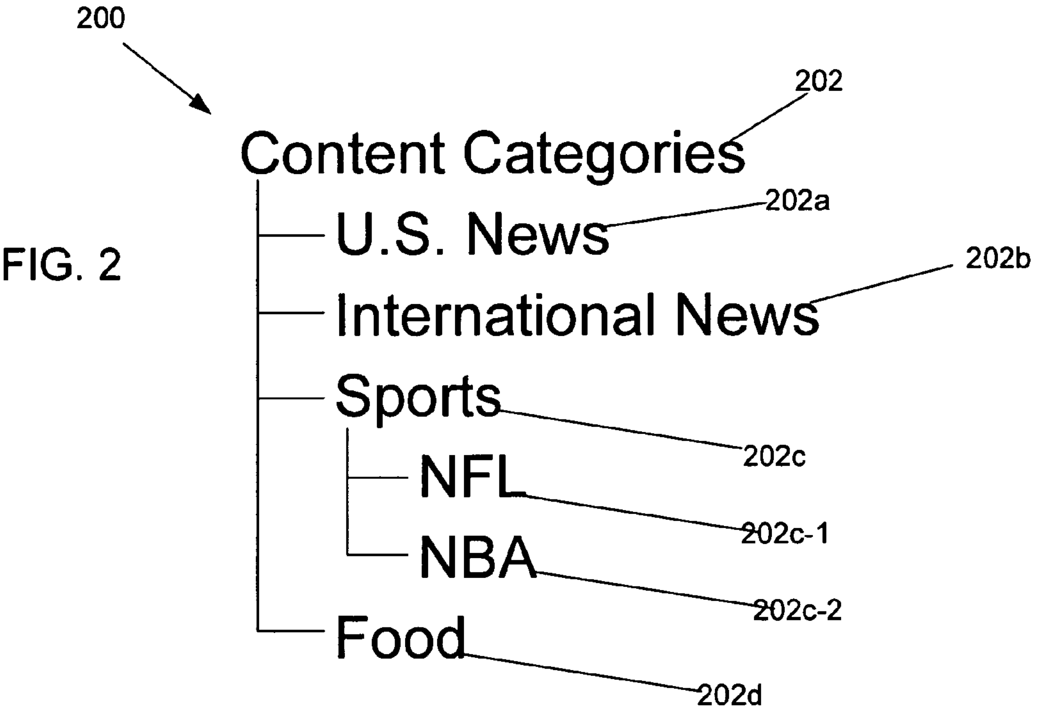
FIG. 2 illustrates an example of content categories that may be used in the advertising system shown in FIG. 1.
FIG. 3 illustrates an example where one or more templates are associated with the content categories.

Referring to FIG. 2, shown is an example 200 of content categories 202 that may be used in advertising system 108 to manage advertising inventory and templates. The content categories 202 include U.S. News 202_a_, International News 202_b_, Sports 202_c_, and Food 202_d_. The Sports category 202_c_ includes the subcategories NFL 202_c_-1 and NBA 202_c_-2. When affiliates enroll and register editorial content, they categorize the editorial content into one of the categories (e.g., Sports). Advertising campaigns are then allocated against the categories such that the advertising content associated with a campaign is shown in conjunction with editorial content associated with a particular category.

As illustrated in FIG. 3, one or more templates 304 are associated with each category 302. As shown in the example, Template A is associated with U.S. News 202_a_. Accordingly, Template A is used to form the playlist used for content categorized in the U.S. News category 202_c_. Also as shown, multiple templates may be associated with a category. For example, Template B, Template C, and Template D are associated with the Sports category 202_c_. Multiple templates may be associated with a category, for example, to provide affiliates with different options for the user experience (for example, some affiliates may choose to select templates with less advertising content than other affiliates) and/or to allow advertising operations managers to select templates that help meet advertiser goals. For example, a template that places more advertising content with editorial content may be used during times when there are more campaigns allocated than available inventory, while a template that places less advertising content with editorial content may normally be used.

Multiple templates also may be associated with a category to provide differing user experiences each time a user selects editorial content from a particular affiliate (such as affiliate system 106). That is, multiple templates may be associated with a category and chained together such that after a template has been used a particular number of times for a particular user, the next template is then used. For example, a set of two templates may be associated with a particular category of content, with the first template defining that an advertisement is played before the editorial content and the second template defining that only the editorial content is presented. The first time a particular user selects content in the category from a particular affiliate system, the first template is used such that an advertisement is presented and then the editorial content is presented. The next time the particular user selects editorial content in the category from the same affiliate system, the second template is used such that only the editorial content is presented. As described briefly above, advertising system 108 may track and control which template is used for a particular user/client system using a GUID and an affiliate id included in the requests for playlists.

Figure 4:
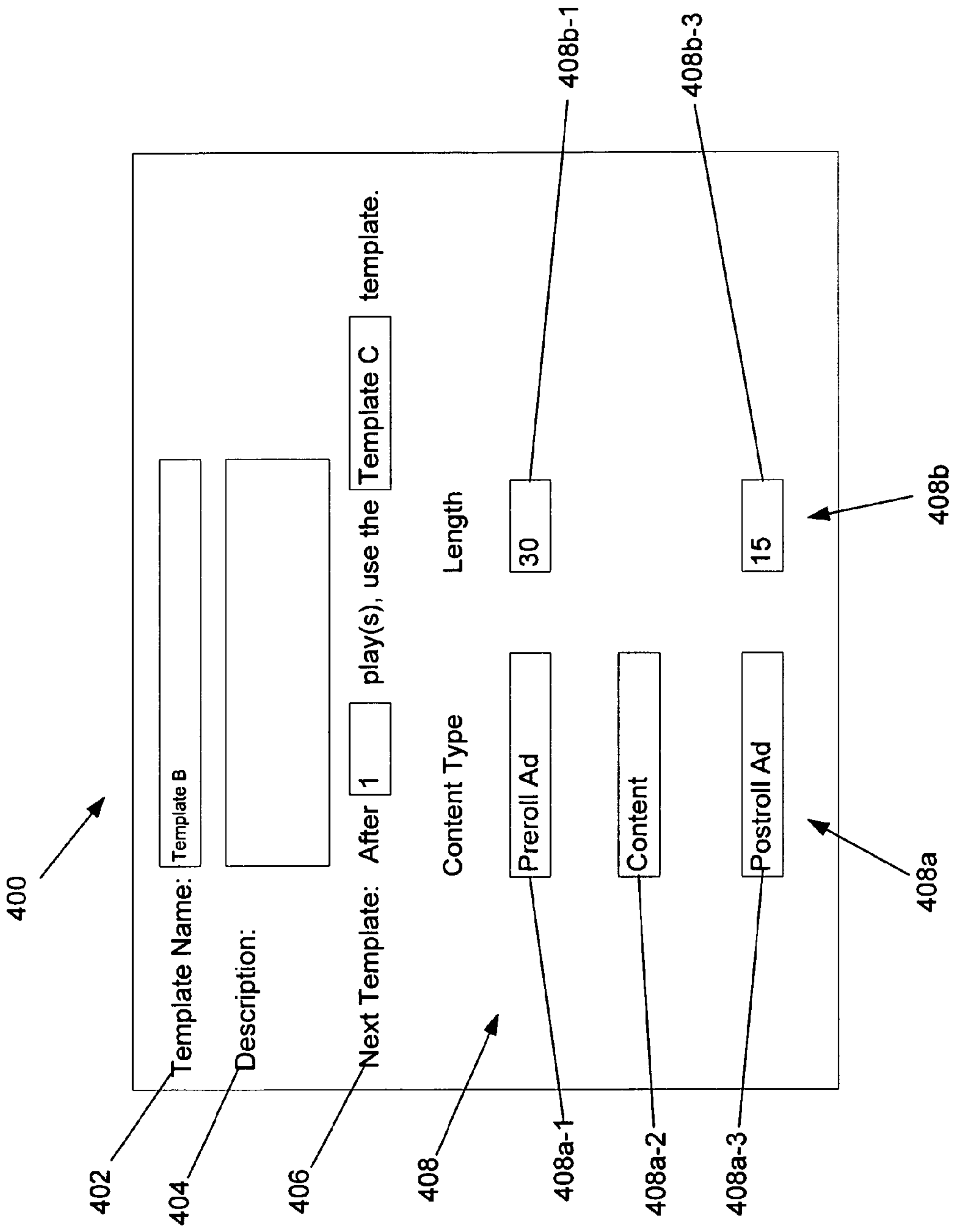
FIG. 4 illustrates an example of a template.

FIG. 4 illustrates an example of a template 400. Template 400 includes a template name 402 (Template B) and a template description 404. The template 400 also includes a chaining section 406 that specifies how template 400 is chained to Template C. In particular, chaining section 406 specifies that template 400 is to be used once, and then Template C is to be used. Template B also includes a user experience section 408 that defines the type, order, and length of content pieces to be included in a playlist based on template 400. Section 408 includes two sections, a content type section 408_a_ and a length section 408_b_. The content type section 408_a_ indicates the type of content and length section 408_b_ indicates the length of the corresponding content. The order of the entries in section 408 designates the order of the content pieces.

In particular, section 408_a_-1 indicates that a preroll advertisement is to be presented first, and section 408_b_-1 indicates that the preroll advertisement has a length of 30 seconds. Section 408_a_-2 indicates that the editorial content is to be presented next. Section 408*a*-3 indicates that a postroll advertisement is to be presented after the editorial content, and section 408*b*-3 indicates that the postroll advertisement has a length of 15 seconds.

Affiliate Enrollment

Figure 5:
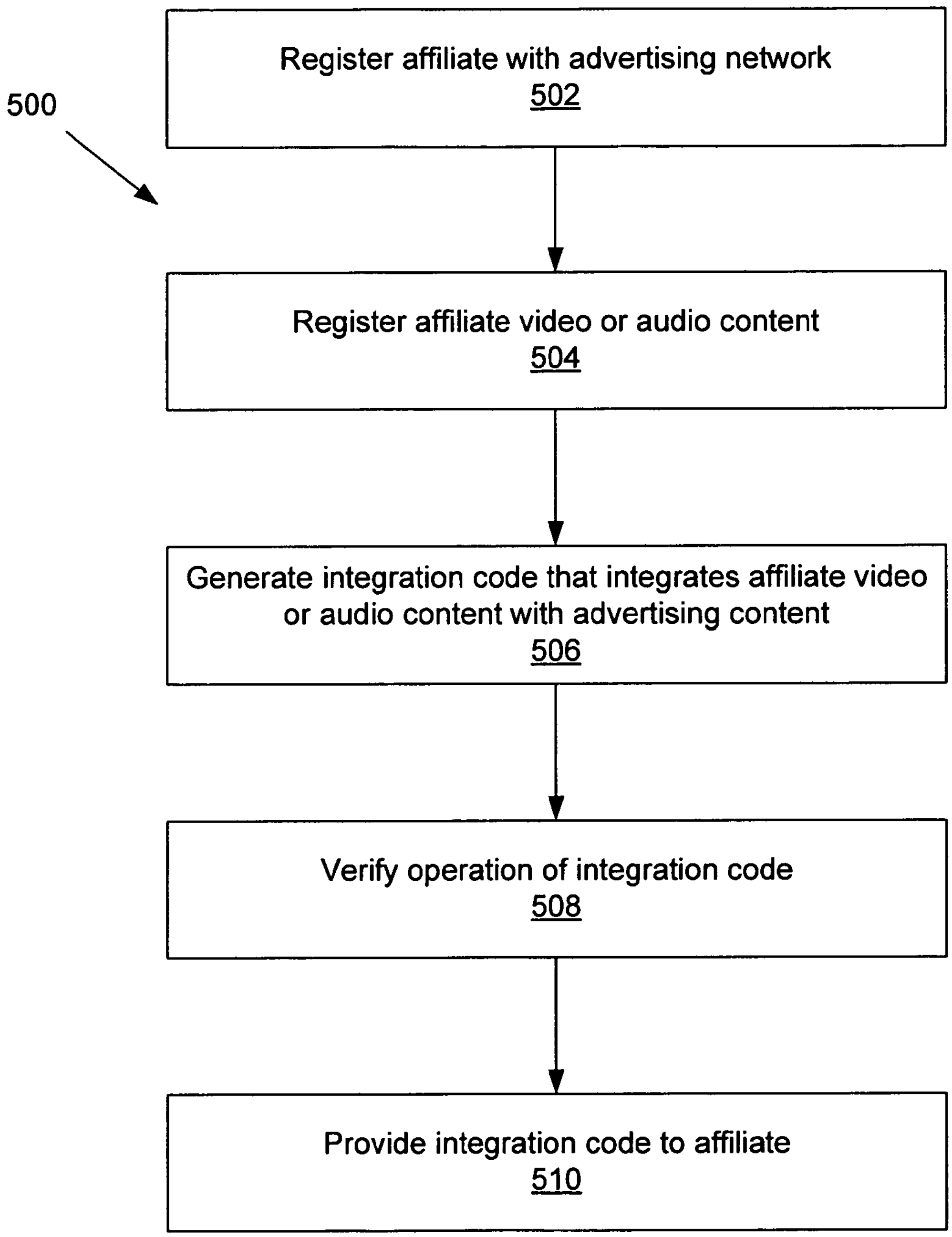
FIG. 5 illustrates a process that may be performed by the registration component shown in FIG. 1.

FIG. 5 illustrates a process 500 that may be performed by registration component 108*a* to enroll affiliates and register their content. First, an affiliate is registered with the advertising network (502). This registration generally includes the registration component 108*a* collecting business related information from the affiliate, such as an address or other contact information as well as information needed to appropriately pay the affiliate for advertising content shown in association with the affiliate's content (e.g., financial information such as a bank account and a social security number or an employer identification number).

Once the affiliate is registered, the affiliate's editorial video and/or audio content is registered (504). To that end, the registration component 108*a* collects information about each piece of content that the affiliate wants to register. This information includes, for example, a location (e.g., URL) of the content, a category of the content, and the format of the content. Such information allows a generated playlist to include advertising content that is relevant to and in the same format as the editorial content. When registering a piece of content, the affiliate, for example, selects a category for the content from pre-designated categories used by advertising system 108 to manage advertising inventory (e.g., content categories 202). Regarding formats, the affiliate designates the format that the piece of content is encoded in, such as Real® Media or Windows Media®. This allows advertising system 108 to select advertising content that has the same, or at least compatible formats, and allows for the playlist to be generated in an appropriate format (e.g., playlists are generated in Synchronized Multimedia Integration Language (SMIL) for Real® Media content and Advanced Systems Format (ASF) for Windows Media® content). Doing so helps to prevent a discontinuous user experience, for example, by preventing selection of advertising content that has a format that is incompatible with the media player used to present the affiliate's editorial content. Alternatively, for affiliate's that use a single format (or if advertising system 108 is designed to only allow one format per affiliate), the registration component 108*a* may collect the information regarding the format of the affiliate's content when registering the affiliate (502).

Once the affiliate has registered a piece of content, the registration component 108*a* generates integration code (such as HTML and/or javascript) (506) to be inserted into the affiliate's web page for the content so that, instead of the affiliate's content being presented by itself, a playlists including the advertising content is retrieved from the advertising system 108 and, as a result, the advertising content and affiliate content is presented. In general, when a user selects content from an affiliate web page, the integration code generates a request to the playlist server 108*c* that describes the particular content. This request may include information about the content, the category or genre of the content, an identifier of the particular affiliate, and, depending on the implementation, a reference to the content itself, among other parameters. As described above, in response to this request, the playlist server 108*b* returns a playlist that includes selected advertising content and the affiliate's content.

The code is generated so as to properly integrate the affiliate's content with the advertising content. To that end, the code may be dynamically generated based on variables provided by the content owner, or created by the system, when the affiliate registers the content with the ad affiliate network. Such variables may include, for example, the type of content (e.g., Real® Media or Windows Media®), a network affiliate id generated by the system, the genre or category of the content, and the location of the content (e.g., URL of the content). Some implementations may include more or less than these variables, or other variables, depending on what information is needed to properly integrate the affiliate's content with the advertising content. For instance, information about the manner in which the content is presented (e.g., on demand or broadcast), and whether the content is presented in an embedded media player or in a stand alone media player may be collected and used when generating the code. An example of code that may be generated is shown in FIG. 6, below.

To insure that the code provided to the affiliate is working properly, the registration component verifies the operation of the generated code (508). To that end, the registration component 108*a* may require the affiliate to view content in a playlist generated according to the code to insure that advertising content can be properly inserted into a stream that includes the affiliate's content. The playlist may include content that contains particular information, which then must be entered by the affiliate. For example, the playlist may include a video that displays a first confirmation code, the affiliate's content, and then another video that displays a second confirmation code. The affiliate then may be required to enter the confirmation codes, and the registration component 108*a* then confirms that the confirmation codes are correct. In this way, the affiliate is required to verify that advertising content can be properly inserted by entering information that could only have been determined by watching a properly configured set of content. Properly integrating the code into the affiliate's website may be as simple as providing sample code or it may include an iterative process designed to insure that multiple web elements synchronized with the video or audio content are properly displayed.

Once the integration code has been verified, this code is provided to the affiliate (510). The affiliate can then place this code into the affiliate's webpage such that, when a user of a client system selects the affiliate's content, the affiliate's content and appropriate advertising content is presented to the user.

FIG. 6 shows an example of code 600 that may be generated for a piece of content registered by an affiliate. This code generates a display such as that shown in FIG. 7.

The code generally includes a video portion 602 and a banner portion 604. In the video portion 602, the <div> tag 602*a* with the "id" attribute 602*b* equal to "MediaPlayerDiv" is generated to define a section that includes a media player. The <embed> tag 602*c* embeds the media player in the MediaPlayerDiv section to show the audio and/or video content. The "type" attribute 602*d* in the <embed> tag 602*c* with a value equal to "application/x-mplayer2" indicates that the Windows Media® Player is to be embedded. The "type" attribute 602*d* is set to this valued because the format of the content makes the content most appropriately presented by Windows Media® Player.

The "src" attribute 602*e* has a value equal to a URL that points to the playlist server 108*c* and that requests a playlist from the playlist server 108*c* (by calling the "getPlaylist" function of the playlist server 108*c*). The URL is generated based on parameters such as the affiliate network id, category of the content, type of streaming technology used (that is, the content format), and the location of the content. For example, the "nwid" parameter 602*f* is set equal to the network affiliate id, the "level" parameter 602*g* indicates the category of the content (which in this case is "FOOD"), and the "responseType" parameter 602*i* is set to the file format for the playlist, which depends on the content format (in this case, the playlist is in "ASX" format because the content is in a corresponding "wmv" format). Also, the "mswmext" parameter 602*j* is set to ".asx" so that the playlist is generated with a file extension of ".asx." The "content" parameter 602*h* has a value equal to the URL for the affiliate content (in this case "http://wms.scripps.com/foodtv/ironchefamerica/ica-judging.wmv"). Although the "content" parameter 602*h* includes the URL of the affiliate content, in other implementations this may not be included, may be hashed, or otherwise may be encrypted or obscured to prevent end users and/or search engines from obtaining the URL to the affiliate content. In addition, the URL for the "src" attribute 602*e* includes a "guid" parameter 602*k* set equal to a "GUID" variable, which is set when the media player 102*a*-1 uses the URL to send a request to playlist server 108*c* for a playlist. Based on the parameters set in the URL for the "src" attribute 602*e*, the playlist server 108*c* generates the playlist that includes the affiliate content and any advertising content.

Figure 7:
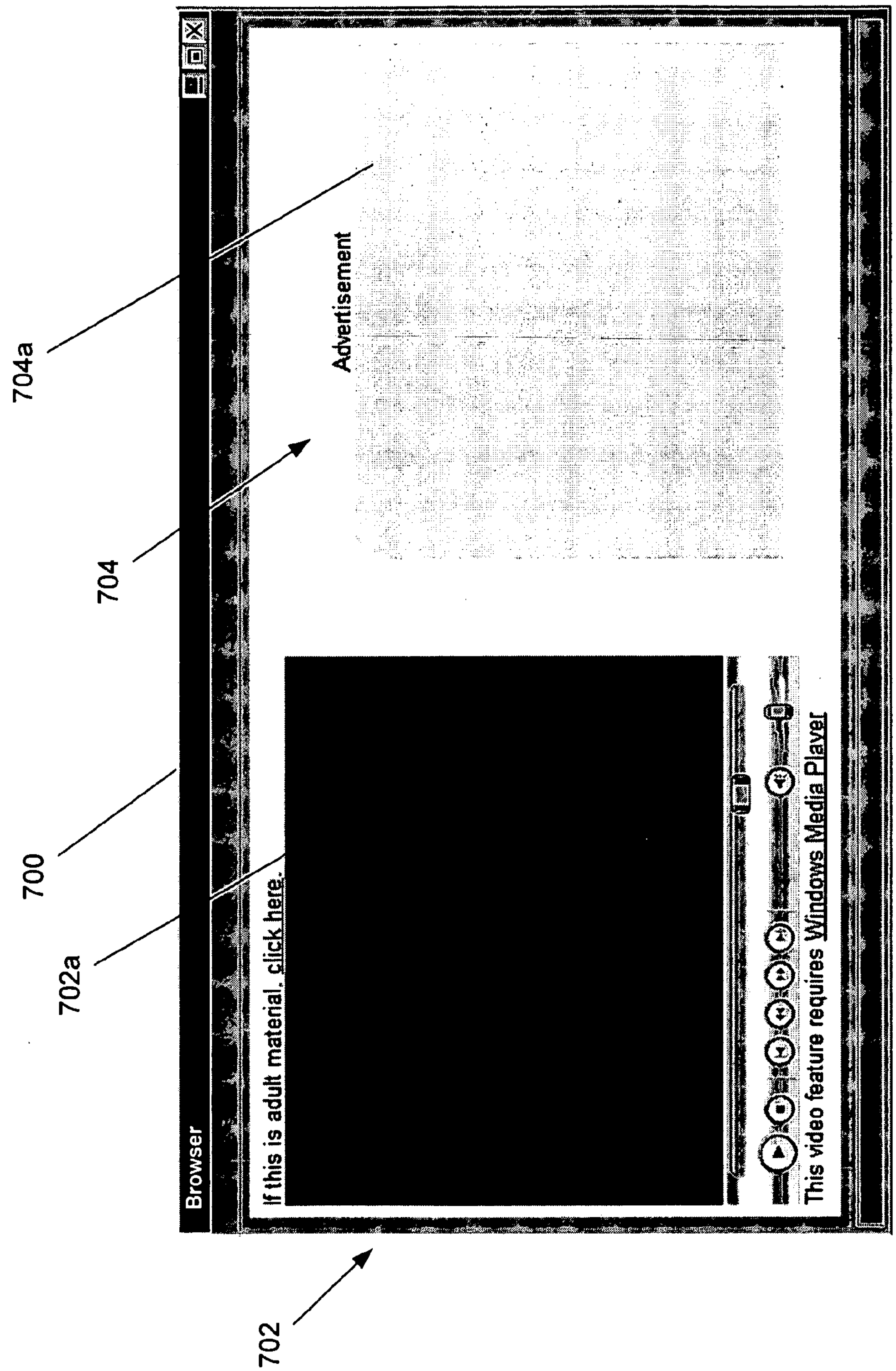
FIG. 7 illustrates a resulting display that is generated in a browser by the code shown in FIG. 6.

In the banner portion 604, the <div> tag 604*a* with the "id" attribute 604*b* equal to "lcBannerDiv" is generated to include a banner in the surrounding web page that is coordinated with the video (see FIG. 7). The "src" attribute 604*c* has a value equal to a URL that also points to the playlist server 108*c*, but instead requests the banner to be displayed in the surrounding web page (by calling the "getAssociatedContent" function of the playlist server 108*c*). Similar to the URL for the "src" attribute 602*e* in the video section 604, the URL set in the banner "src" attribute 604*c* includes parameters that depend on the information provided by the affiliate, or set in the advertising system 108. For example, the "nwid" parameter 604*d* includes the affiliate id, and the "level" parameter 604*e* includes the content category. These parameters are used by the advertising system 108 to select appropriate banner advertisement(s) to be presented with corresponding advertising video and/or audio content in the playlist.

FIG. 7 illustrates the resulting display that is generated by code 600 in a browser 700. The display includes a media player section 702 and a banner advertisement section 704. The media player section 702 includes an embedded media player 702*a*. The banner advertisement section 704 includes a banner advertisement 704*a*.

The media player 702*a* displays the video and/or audio content (editorial and advertising) included in the playlist returned by the playlist server 108*c* in response to the media player 702*a* calling the "getPlaylist" function of the playlist server 108*c* using the URL in the "src" attribute 602*e*. The banner advertisement 704*a* is returned to and displayed by the browser 700 in response to the browser calling the "getAssociatedContent" function using the URL in the "src" attribute 604*c*.

Figure 8A:
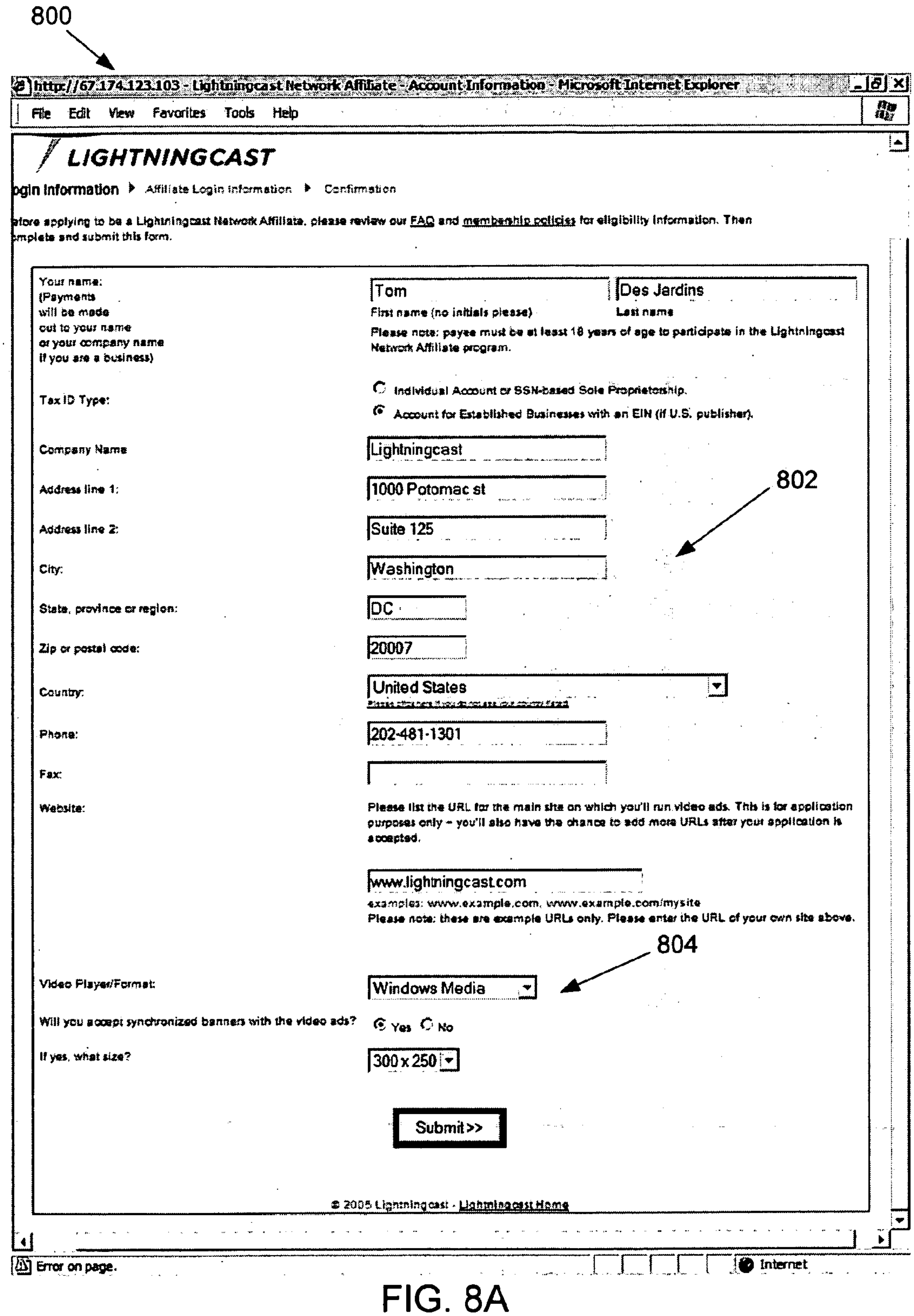
FIGS. 8A-8D illustrate examples of webpages that are generated by the registration component to register the affiliate, register the affiliate's content, and to verify and provide generated code to the affiliate.

FIGS. 8A-8D illustrate examples of webpages that are generated by the registration component 108*a* to register the affiliate, register the affiliate's content, and to verify and provide the generated code to the affiliate. In particular, FIG. 8A illustrates an affiliate registration webpage 800 presented by the registration component 108*c* to obtain information from the affiliate to register the affiliate with the advertising affiliate network. The affiliate registration webpage includes a section 802 in which the affiliate enters business related information, such as the affiliate's name, the affiliate's address, and the URL for the main website from which the affiliate provides editorial content. The affiliate registration page 800 also includes a section 804 in which the affiliate enters the format of its content, and whether the affiliate wishes to have banner advertisements displayed with the video and/or audio content (and, if so, the size of the banner advertisements).

Figure 8B:
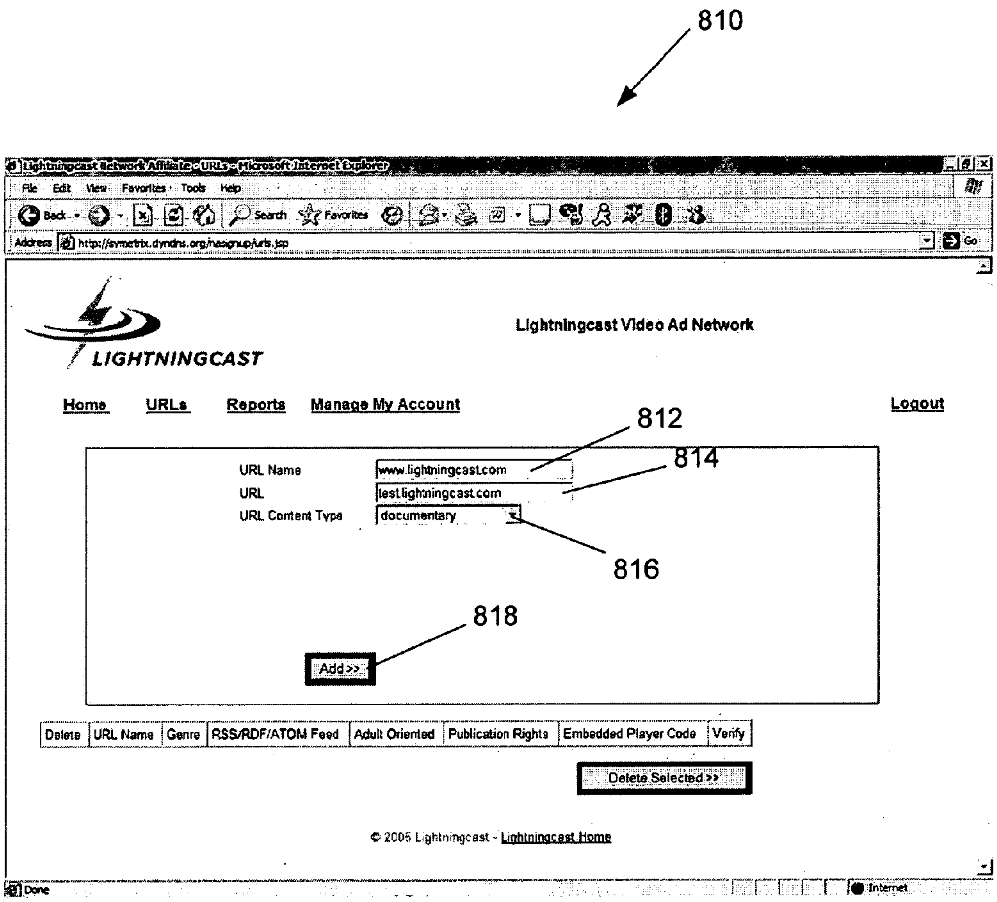

FIG. 8B illustrates an affiliate content registration webpage 810 presented by the registration component 108*c* to register a particular piece of the affiliate's content. The affiliate content registration webpage 810 includes a section 812 in which the affiliate enters a name for the content, a section 814 in which the affiliate enters the URL for the content, and a section 816 that allows the affiliate to select a category for the content. The affiliate content registration webpage 810 also includes an add button 816, which the affiliate can select to submit the content information provided in sections 812-816.

Figure 8C:
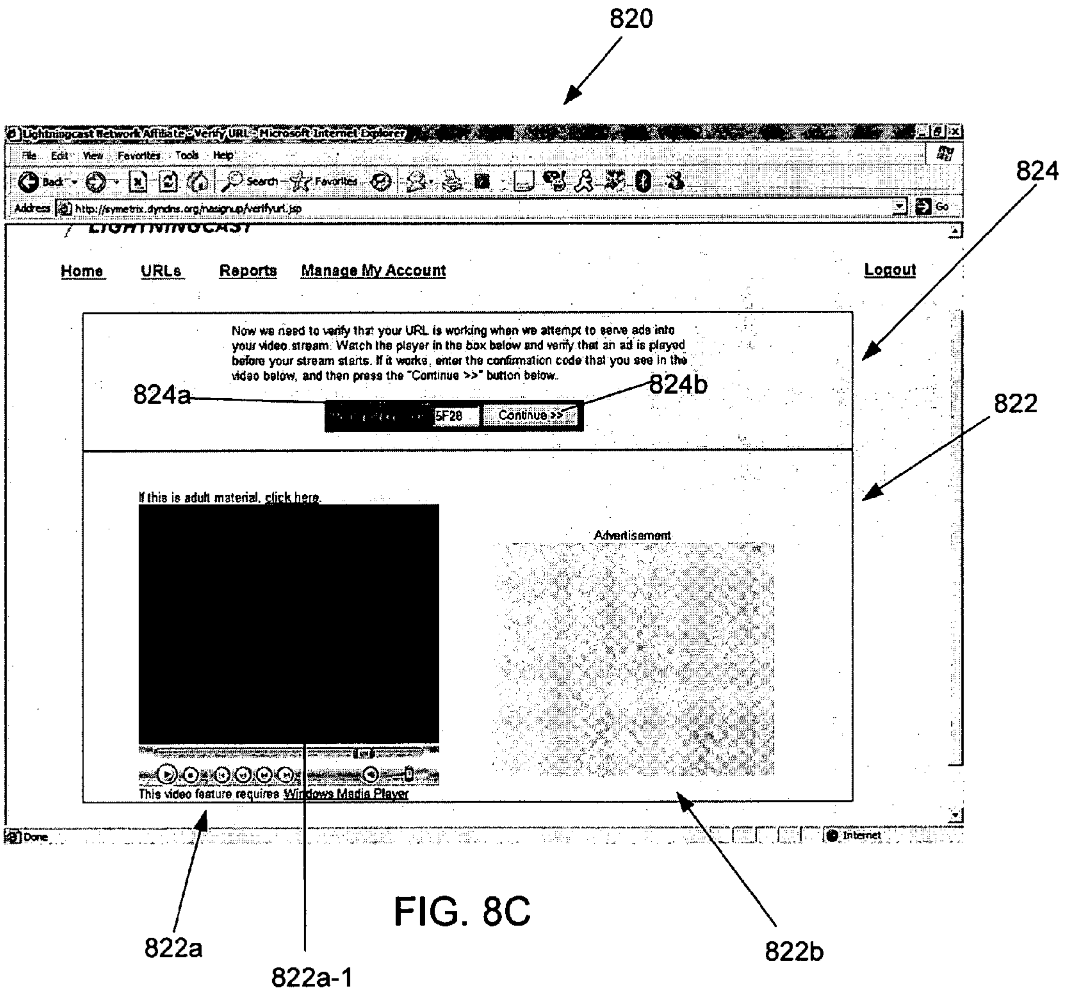

Referring to FIG. 8C, once the affiliate submits the content information using the affiliate content registration webpage 810, the registration component 108*c* presents a verification webpage 820 to verify the proper operation of the code generated for the content registered using affiliate content registration webpage 810. The verification webpage 820 includes a test section 822 produced from the generated code, and a verification section 824 used to verify the operation of the code. The test section 822 shown includes a media player section 822*a* that includes a media player 822*a*-1 and a banner advertisement section 822*b* that includes a banner advertisement 822*b*-1. When the test code is being verified, the advertising system 108 is configured, for example, to provide a playlist to media player 822*a*-1 that contains an initial video that includes a confirmation code, and then the affiliate's content. The media player 822*a*-1 then presents the initial video and the affiliate's content. Assuming that this is properly done, the affiliate then enters the confirmation code shown in the initial video into a box 824*a* in the verification section 824 and selects a continue button 824*b* in the verification section 824. The advertising system 108 then verifies that the confirmation code entered is correct.

Figure 8D:
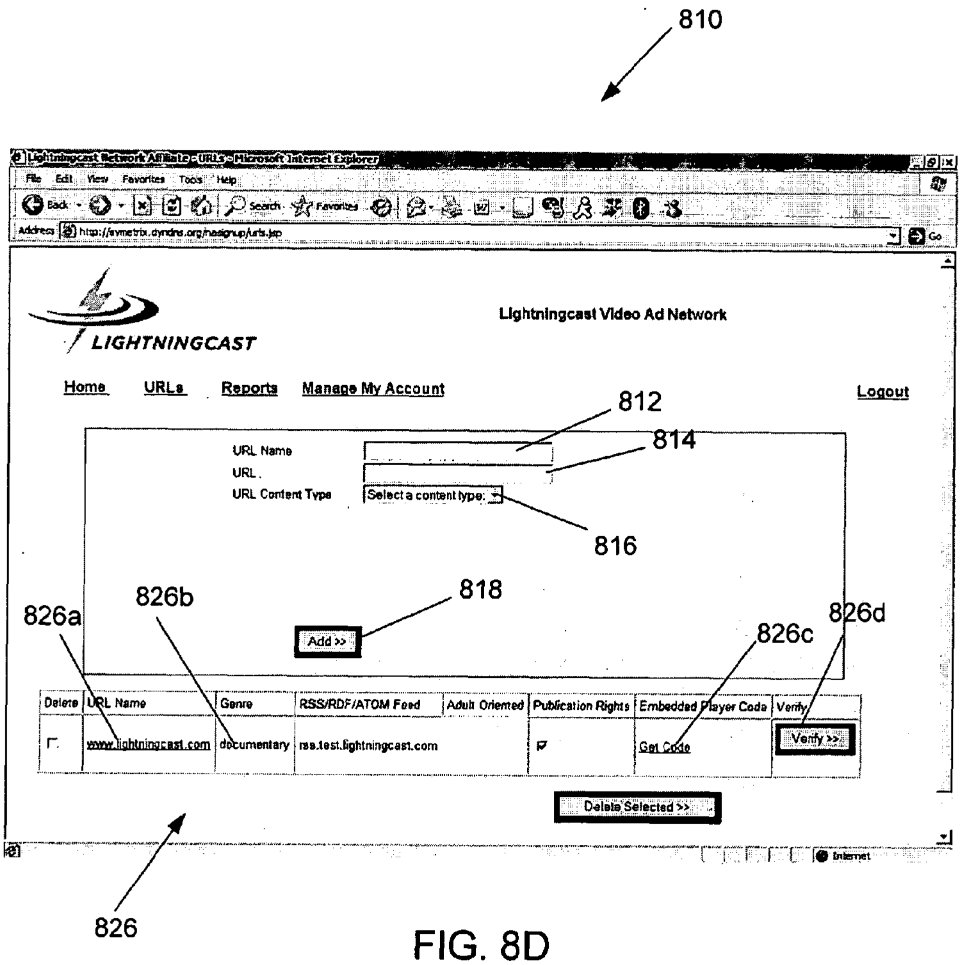

Referring to FIG. 8D, after the confirmation code has been verified, the registration component 108*c* returns to the affiliate content registration webpage 810. However, at this point, the affiliate content registration webpage 810 includes a listing of the registered piece of content. The listing includes the name of the content 826*a*, the selected category for the content 826*b*, and a link 826*c* to the generated code so that the affiliate can obtain the code and integrate it into the affiliate's webpage. The listing also contains a verification button 826*d*, which allows the affiliate to verify the operation of the generated code again (e.g., if the affiliate is experiencing problems after integrating the code into its webpage).

Delivering Editorial and Advertising Content

FIGS. 9A-11B illustrate various implementations of the operation of system 100 when delivering editorial and advertising content to client system 102. The implementations shown in FIGS. 9A-11B include various mechanisms that may prevent client systems from directly accessing the editorial content, and are based on a situation in which the playlist includes a piece of advertising content followed by the editorial content.

Figure 9A:
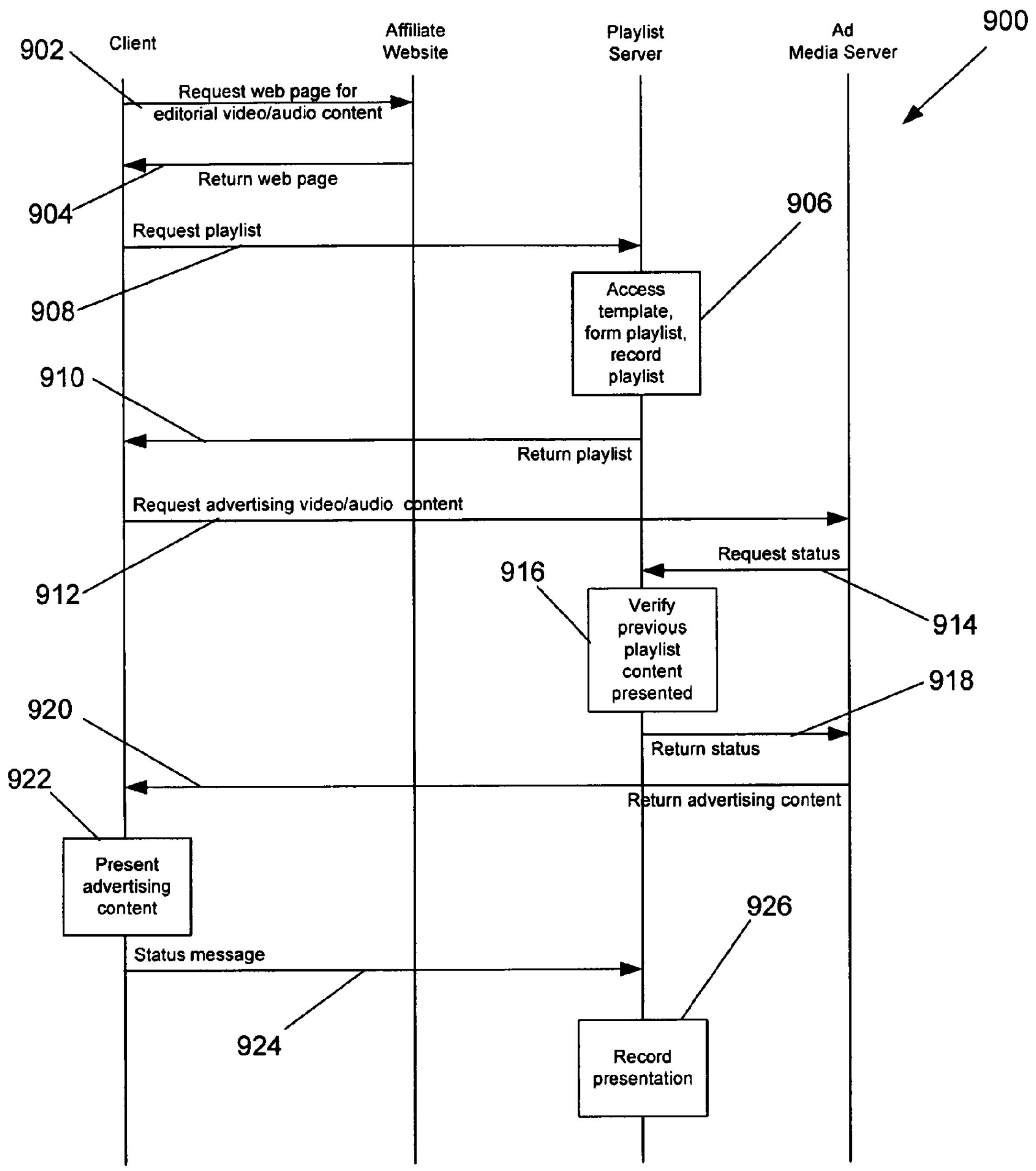
FIGS. 9A-11B illustrate various implementations of the operation of the system shown in FIG. 1 when delivering editorial and advertising content.
Figure 9B:
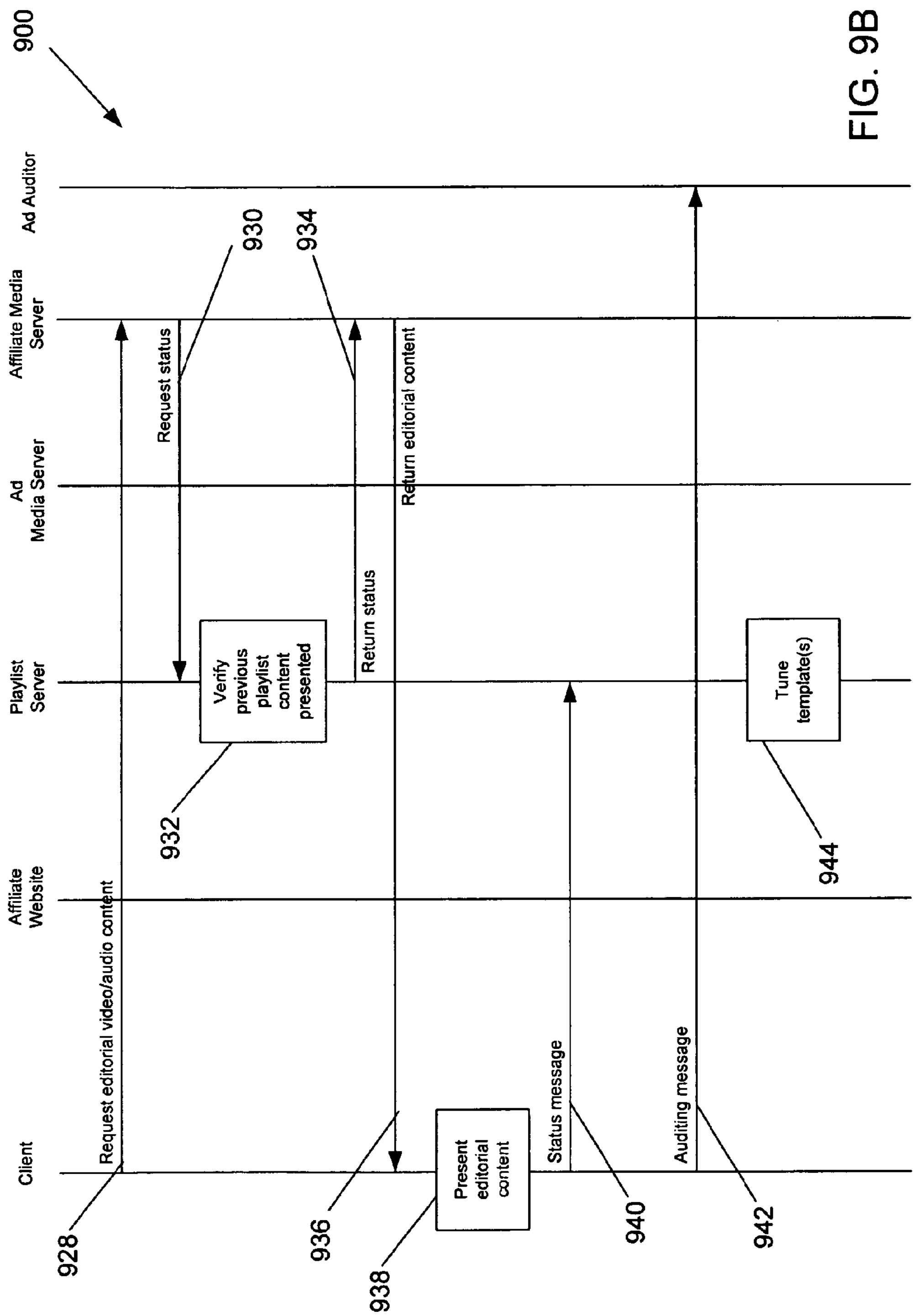

Referring to FIGS. 9A and 9B, in implementation 900, client systems are prevented from directly accessing the editorial content through the use of status messages sent from the client system to the playlist server when the client system presents a video and/or audio media item from the playlist. In general, the status messages indicate that the client system has presented the corresponding media item and, therefore, allow the playlist server 108*c* to track which media items a particular client system has presented. The affiliate media server 106 then may query the playlist server 108*c* to verify that previous media items in the playlist where presented before providing the client system with access to the editorial content.

In particular, when a user of client system 102 selects a particular piece of editorial content from affiliate website 106*a*, the browser 102*a* sends a request to affiliate website 106*a* for the affiliate webpage for the editorial content (902). The webpage includes the code generated during the registration process for the particular piece of editorial content. The affiliate website 106*a* returns the webpage with the code (904).

When browser 102*a* renders the webpage with the code, the media player 102*a*-1 embedded in the webpage requests the playlist from the playlist server 108*c* (906). The request may include, for example, the content category, a GUID for client system 102, a network affiliate id, an identifier of the content (e.g., URL), and an indication of the content format. The playlist server 108*c* accesses the corresponding template using information in the request (e.g., selects the template based on the content category) and uses the template to form a playlist (908). The playlist server 108*c* also records the GUID of the client system 102 and the associated playlist sent to client system 102 (908). The playlist server 108*c* then returns the playlist to the media player 102*a*-1 (910), which uses the playlist to present the content in the playlist.

To that end, the media player 102*a*-1 requests the first item in the playlist, which in this example is a piece of advertising content. To do so, the media player 102*a*-1 sends a request to the advertising media server 108*b* for the advertising content (912). The request to the advertising media server 108*b* includes the GUID of the client system 102. The advertising media server 108*b* then sends a request to the playlist server 108*c* for the playlist status of the client system 102 (914). The request to the playlist server 108*c* includes the GUID and an identification of the advertising content requested. The playlist server 108*c* determines whether the advertising media server 108*b* should provide the advertising content to the media player 102*a*-1 by checking whether the media player 102*a*-1 presented the content item in the playlist that is prior to the requested content (if any) and, if so, whether it was presented within a particular time period (916). In this case, the requested advertising content is the first item in the playlist provided to the media player 102*a*-1 by the playlist server 108*c* and, therefore, the playlist server 108*c* responds to the advertising media server 108*b* with an indication that the advertising media server 108*b* should provide the requested advertising content to the media player 102*a*-1 (918). If, on the other hand, the advertising content requested by the media player 102*a*-1 was not the same as the advertising content listed in the playlist, the playlist server 108*c* would respond to the advertising media server 108*b* with an indication that the advertising media server 108*b* should not provide the requested advertising content to the media player 102*a*-1. When the advertising media server 108*b* receives the indication that it should provide the media player 102*a*-1 with the advertising content, the advertising media server 108*b* returns the advertising content to the media player 102*a*-1 (920), which then presents the advertising content (922).

Once the media player 102*a*-1 presents the advertising content (922), the media player 102*a*-1 sends a status message to the playlist server 108*c* (924). The status message includes an identifier of the content presented, the GUID of the client system 102, and a time stamp. The playlist server 108*c* uses the status message to record that the client system 102 presented the advertising content, and the time that the advertising content was presented (926).

The media player 102*a*-1 then requests the next item in the playlist, which in this example is the editorial content. Thus, the media player 102*a*-1 sends a request to the affiliate media server 106*b* for the editorial content (928). The affiliate media server 106*b* then sends a request to the playlist server 108*c* for the playlist status of the client system 102 (930). The request to the playlist server 108*c* includes the GUID and an identification of the editorial content requested. The playlist server 108*c* determines whether the affiliate media server 106*b* should provide the editorial content to the media player 102*a*-1 by checking whether the media player 102*a*-1 presented the content item in the playlist that is prior to the requested content (if any) and, if so, whether it was presented within a particular time period (932). In this case, the playlist server 108*c* verifies that the media player 102*a*-1 presented the advertising content within the specified time period and, therefore, the playlist server 108*c* responds to the affiliate media server 106*b* with an indication that the affiliate media server 106*b* should provide the requested editorial content to the media player 102*a*-1 (934). If, on the other hand, the editorial content requested by the media player 102*a*-1 was not the same as the editorial content listed in the playlist, the advertising content had not been presented by the media player 102*a*-1, or the advertising content had not been presented within the specified time period, the playlist server 108*c* would respond to the affiliate media server 108*b* with an indication that the affiliate media server 106*b* should not provide the requested editorial content to the media player 102*a*-1. When the affiliate media server 106*b* receives the indication that it should provide the media player 102*a*-1 with the editorial content, the affiliate media server 106*b* returns the editorial content to the media player 102*a*-1 (936), which then presents the advertising content (938). After presenting the editorial content, the media player 102*a*-1 sends a status message to the playlist server 108*c* regarding the editorial content (940).

Before, during, or after the presentation of one or more pieces of advertising content, the media player 102*a*-1 sends one or more auditing messages to the ad auditor 108*f* (942). As described above, the auditing messages indicate that a particular piece of advertising or editorial content was presented to the user, and may indicate the user's behavior while the advertising or editorial content was being presented (e.g., whether the browser 102 was minimized, whether the user paused the media player 102*a*-1, or whether the media player 102*a*-1 was in full screen mode). The auditing messages also may contain other information, such as the category of editorial content, an identifier of the editorial content, and the time that the content is being presented. This information is used by ad auditor 108*f* to provide information about, for example, campaign performance, audience metrics, and audience behavior This information also may be used by the playlist server 108*c* to tune or adjust the template associated with the affiliate's content in a manner that is particular to the affiliate (944). For example, as described above, the template may be adjusted by changing the ratio or amount of advertising content that is presented with the affiliate's content. This may allow the advertising system 108 to properly tune the amount of advertising content presented to match the audience's patience for advertising in general, or on a time specific basis.

In other implementations, instead of status messages, only auditing messages may be sent during or after each piece of content is presented. In such an implementation, the auditing messages may be sent to ad auditor 108*f* instead of playlist server 108*c*, and playlist server 108*c* may access the appropriate information from the ad auditor 108*f* when determining whether a media server should provide the requested content.

Figure 10A:
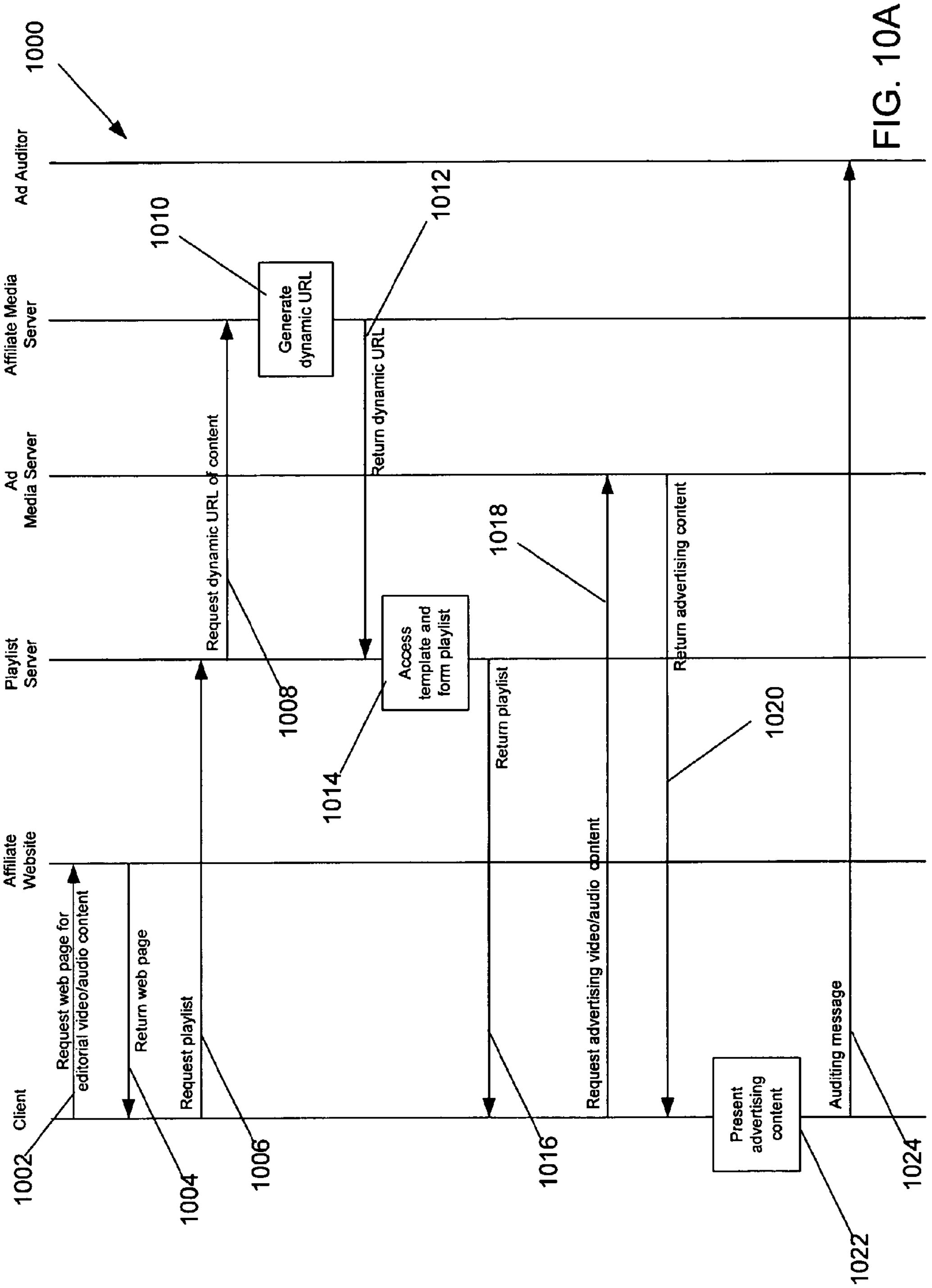
Figure 10B:
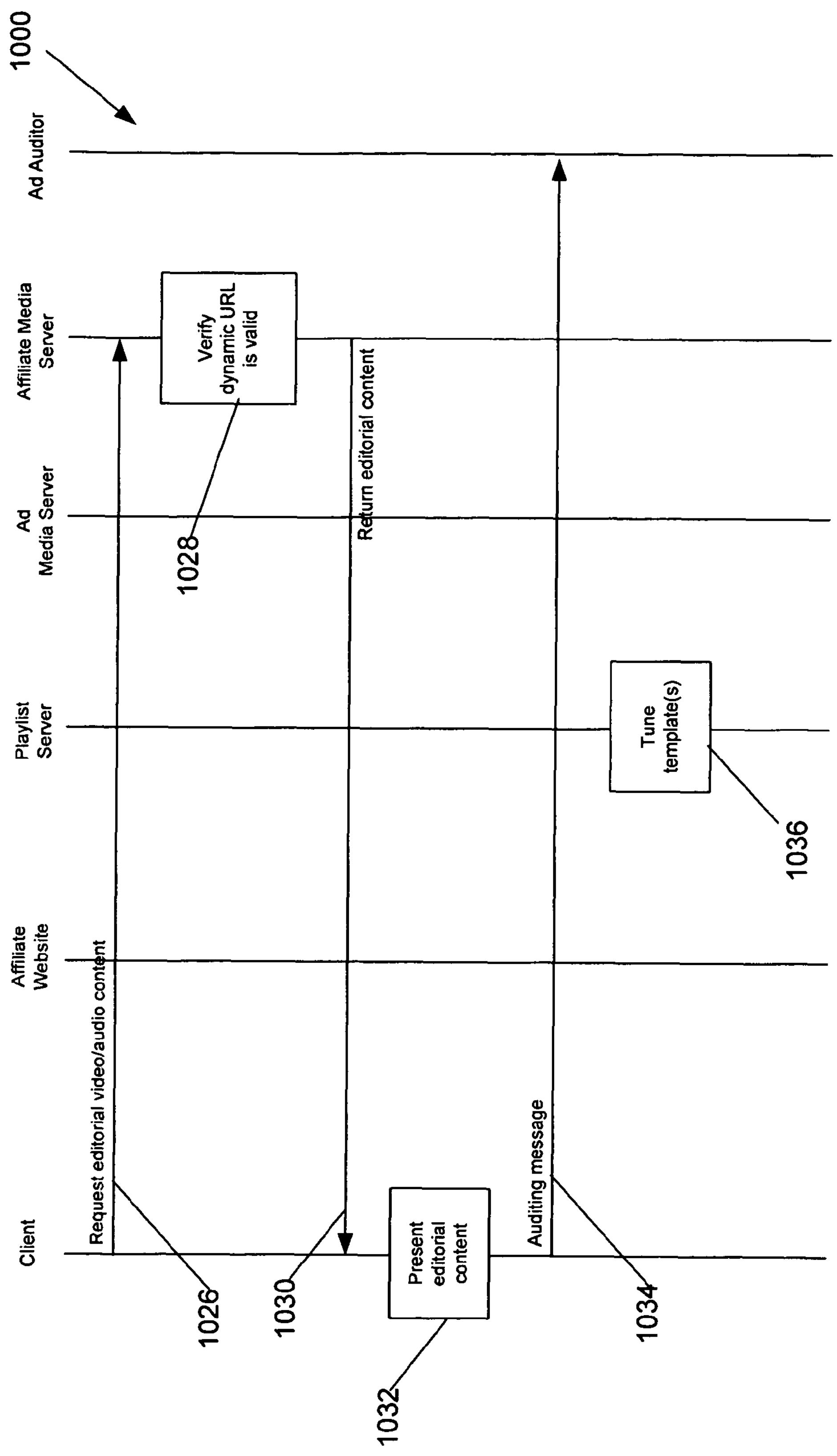

Referring to FIGS. 10A and 10B, in another implementation 1000, the affiliate media server 106*b* generates a dynamic URL for the editorial content and then transmits the dynamic URL to the playlist server 108*c* such that the playlist server 108*c* includes the dynamic URL in the generated playlist. The dynamic URL is valid for a specified time period. Thus, when the client system 102 requests the editorial content, the affiliate media server 106*b* verifies that the client system 102 obtained the URL used in the request from a playlist by determining whether the URL used by the client system 102 is a currently valid dynamic URL. Accordingly, even if a search engine spider uncovered the dynamic URL, the dynamic URL would soon expire and, therefore, a user selecting the dynamic URL in a search result could not directly access the content.

In particular, when a user of client system 102 selects a particular piece of editorial content from affiliate website 106*a*, the browser 102*a* sends a request to affiliate website 106*a* for the affiliate webpage for the editorial content (1002). The webpage includes the code generated during the registration process for the particular piece of editorial content. The affiliate website 106*a* returns the webpage with the code (1004).

When browser 102*a* renders the webpage with the code, the media player 102*a*-1 embedded in the webpage requests the playlist from the playlist server 108*c* (1006). The request may include, for example, the content category, a GUID for client system 102, a network affiliate id, an identifier of the content, and an indication of the content format. The playlist server 108*c* then requests a dynamic URL from the affiliate media server 106*b* (1008). The affiliate media server 106*b* generates the dynamic URL for the content (1010) and returns the dynamic URL to the playlist server 108*c* (1012).

The playlist server 108*c* then accesses the corresponding template using information in the playlist request and uses the template to form a playlist that includes the dynamic URL (1014). The playlist server 108*c* then returns the playlist to the media player 102*a*-1 (1016), which uses the playlist to present the content in the playlist.

To that end, the media player 102*a*-1 requests the first item in the playlist, which in this example is a piece of advertising content. To do so, the media player 102*a*-1 sends a request to the advertising media server 108*b* for the advertising content (1018). The advertising media server 108*b* returns the advertising content to the media player 102*a*-1 (1020), which then presents the advertising content (1022). Once the media player 102*a*-1 presents the advertising content (1022), the media player 102*a*-1 sends an auditing message regarding the advertising content to the ad auditor 108*f* (1024).

The media player 102*a*-1 then requests the next item in the playlist, which in this example is the editorial content. Thus, the media player 102*a*-1 sends a request to the affiliate media server 106*b* for the editorial content (1026). The request is based on the dynamic URL included in the playlist from the playlist server 108*c*. The affiliate media server 106*b* then verifies that the URL used by the client system 102 is a valid dynamic URL (1028). In the example shown, the URL used by the media player 102*a*-1 to request the editorial content is the dynamic URL in the playlist and, therefore, the affiliate media server 106*b* returns the requested editorial content to the media player 102*a*-1 (1030), which then presents the editorial content (1032).

After presenting the editorial content, the media player 102*a*-1 sends an auditing message to the playlist server 108*c* regarding the editorial content (1034). The auditing messages are used to provide information about, for example, campaign performance, audience metrics, and audience behavior and are used by the playlist server 108*c* to tune or adjust the template associated with the affiliate's content in a manner that is particular to the affiliate (1036).

In an alternate implementation, the playlist server may pass the GUID to the affiliate media server 106*b* when requesting the dynamic URL (1008). The affiliate media server 106*b* then associates the dynamic URL with the GUID (1010). Then, when the media player 102*a*-1 requests the editorial content (1028), it includes the GUID in the request, and the affiliate media server 106*b* verifies that the dynamic URL is still valid, and that it is the dynamic URL generated for that particular GUID (1028).

Figure 11A:
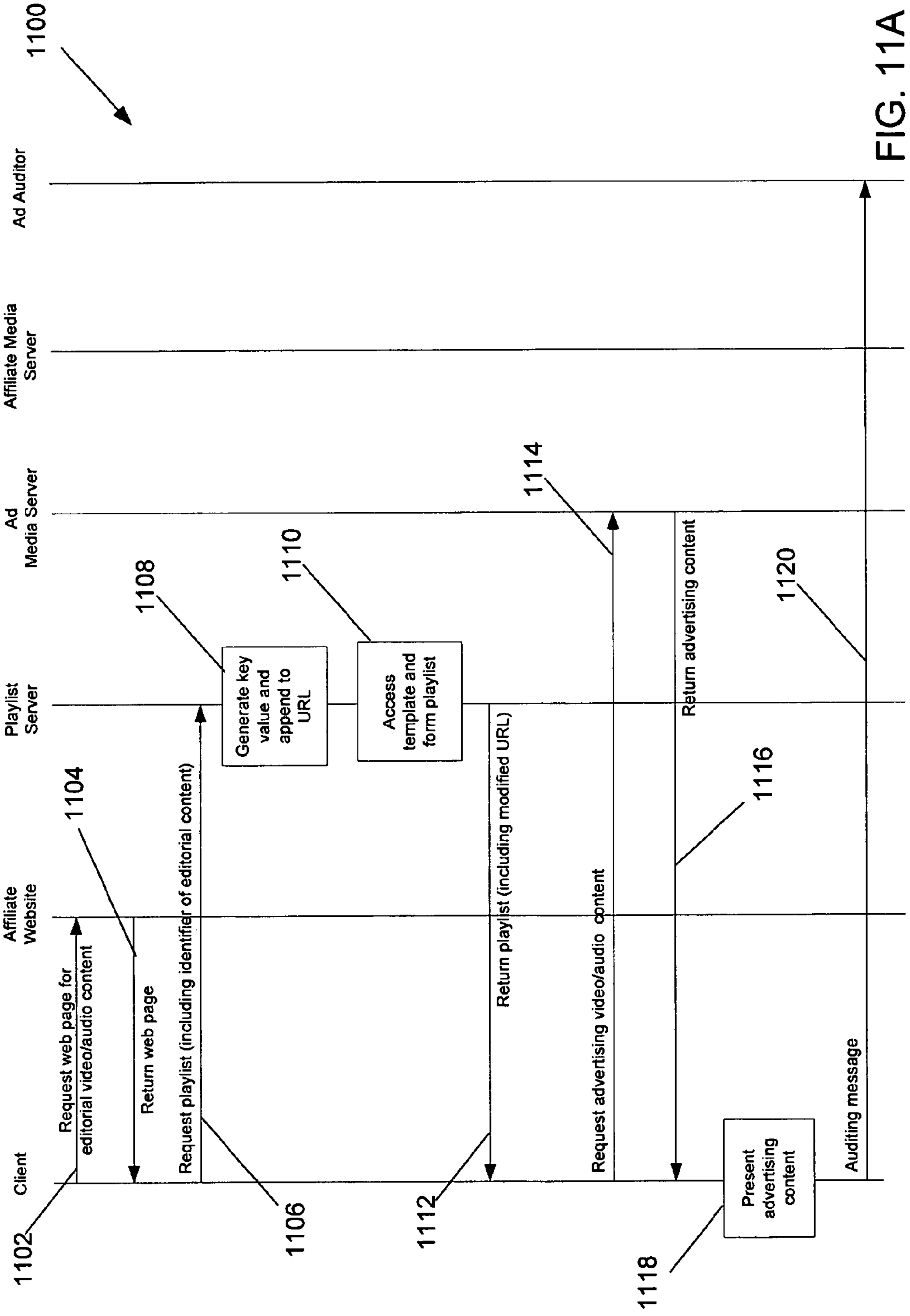
Figure 11B:
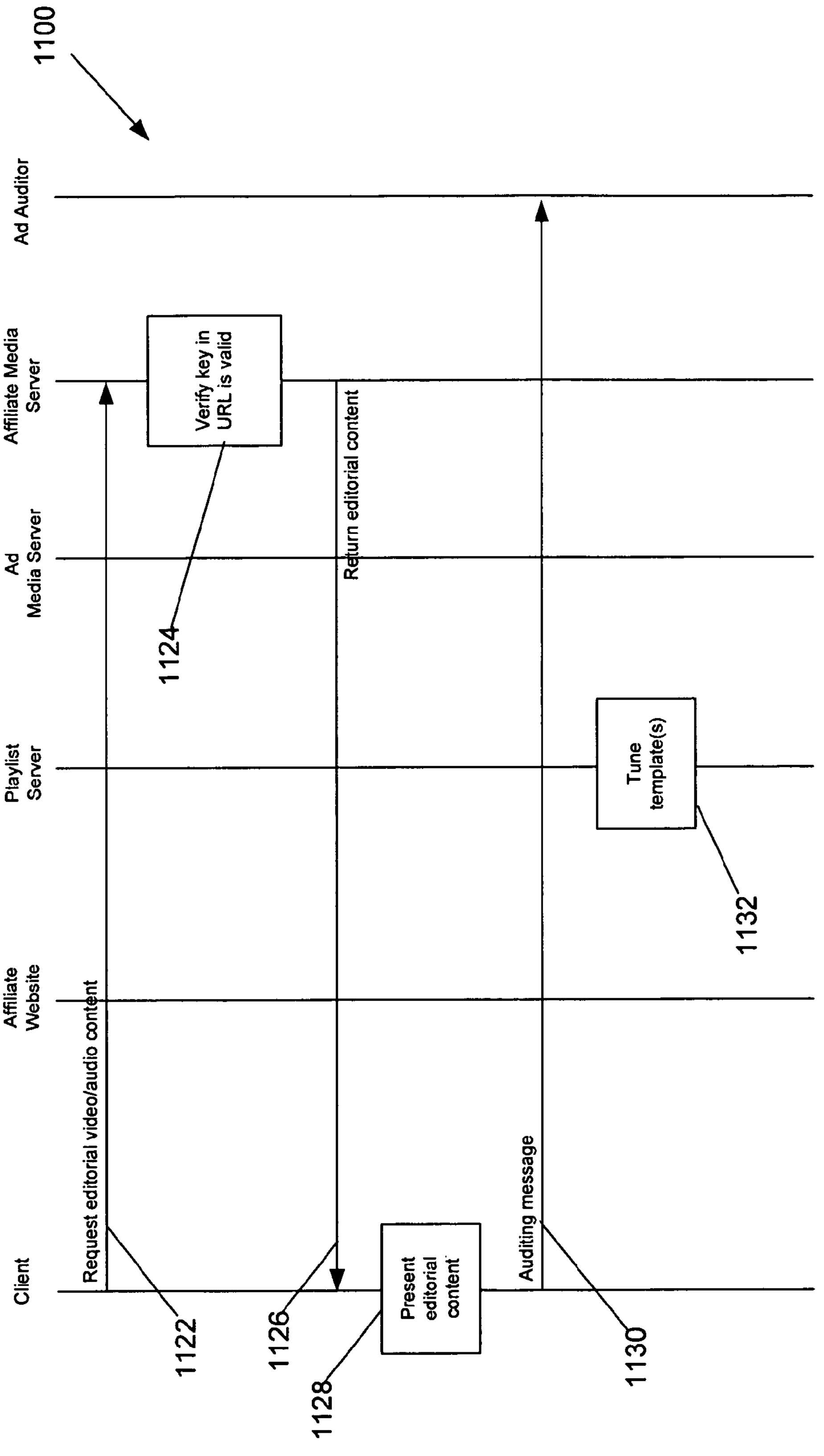

Referring to FIGS. 11A and 11B, in another implementation 100, the playlist server 108*c* appends a mathematically generated content key to the URL for the editorial content, and includes the URL with the mathematically generated content key in the playlist provided to the client system 102. The URL with the mathematically generated content key is then used by the client system 102 to request the editorial content, such that the content key is included in the request. The affiliate media server 106*b* then verifies that the content key is valid and, if so, returns the editorial content.

In particular, when a user of client system 102 selects a particular piece of editorial content from affiliate website 106*a*, the browser 102*a* sends a request to affiliate website 106*a* for the affiliate webpage for the editorial content (1102). The webpage includes the code generated during the registration process for the particular piece of editorial content. The affiliate website 106*a* returns the webpage with the code (1104).

When browser 102*a* renders the webpage with the code, the media player 102*a*-1 embedded in the webpage requests the playlist from the playlist server 108*c* (1106). The request may include, for example, the content category, a GUID for client system 102, a network affiliate id, an identifier of the content (e.g., the URL of the content or a unique content identifier value), and an indication of the content format.

The playlist server 108*c* then generates the content key and creates a playlist identifier for the editorial content by appending the content key to the URL of the editorial content (1108). If the URL is included, in the playlist request (1106), the playlist server simply accesses the URL from the playlist request (1106), generates the key, and appends the key to the URL. Alternatively, if a unique content identifier value is included in the playlist request (1106), the playlist server 108*c* uses the unique content identifier value to look up the URL for the editorial content, then generates the content key and appends the key to the URL.

The playlist server 108*c* then accesses the corresponding template using information in the playlist request and uses the template to form a playlist that includes the URL with the content key (1110). The playlist server 108*c* then returns the playlist to the media player 102*a*-1 (1112), which uses the playlist to present the content in the playlist.

To that end, the media player 102a-1 requests the first item in the playlist, which in this example is a piece of advertising content. To do so, the media player 102a-1 sends a request to the advertising media server 108b for the advertising content (1114). The advertising media server 108b returns the advertising content to the media player 102a-1 (1116), which then presents the advertising content (1118). Once the media player 102a-1 presents the advertising content (1118), the media player 102a-1 sends an auditing message regarding the advertising content o the ad auditor 108f (1120).

The media player 102a-1 then requests the next item in the playlist, which in this example is the editorial content. Thus, the media player 102a-1 sends a request to the affiliate media server 106b for the editorial content (1122). The request is based on the modified URL included in the playlist from the playlist server 108c such that the request includes the content key appended to the URL.

The affiliate media server 106b then verifies that the content key included in the request is valid (1124). In the example shown, the content key is valid and, therefore, the affiliate media server 106b returns the requested editorial content to the media player 102a-1 (1126), which then presents the advertising content (1128).

After presenting the editorial content, the media player 102a-1 sends an auditing message to the playlist server 108c regarding the editorial content (1130). The auditing messages are used to provide information about, for example, campaign performance, audience metrics, and audience behavior and are used by the playlist server 108c to tune or adjust the template associated with the affiliate's content in a manner that is particular to the affiliate (1132).

The following describes a particular implementation for generating and validating the content key. The implementation uses a 32-bit hash algorithm, a 32-bit shared key, and the current Greenwich Mean Time (GMT) to generate and validate the key (referred to as CONTENTKEY). In this implementation, when the playlist server 108c receives the playlist request, it generates the key as follows. A hash algorithm is applied to the URL for the editorial content to generate a unique 32-bit hash (referred to as CONTENTHASH) for the string representing the URL. A shared (i.e., shared between the affiliate system 106 and the advertising system 108), private, rotating 32-bit key (referred to as SHAREDKEY) is then XORed against the generated unique 32-bit hash. The current GMT time in milliseconds (referred to as GMTTIME) is also XORed into the generated key to generate the CONTENTKEY. The CONTENTKEY is then appended to the URL for the editorial content as a base-64 parameter (referred to as B64PARAM). The URL with the appended B64PARAM is then included in the playlist returned to the client system 102.

The client system 102 then uses the modified URL to request the editorial content from affiliate media server 106b such that B64PARAM is included in the request. The affiliate media server 106b then converts the B64PARAM into its 32-bit CONTENTKEY value. The affiliate media server 106b also generates CONTENTHASH from the URL for the editorial content using the same hashing algorithm that was used by the playlist server 108c and XORs the CONTENTKEY with the CONTENTHASH and the SHAREDKEY. The result is GMTTIME. If retrieved GMTTIME is correct within some predefined threshold of the current time, then the editorial content is returned by the affiliate media server 106b. Otherwise the affiliate media server 106b returns an error.

The following is an example of this implementation as applied to the following example of a URL for editorial content:

http://customer.com/media/media_file.wmv.

The URL for requesting the playlist is, for example:

http://web.lc.net/getPlaylist?content=http://customer-.com/media/media_file.wmv and therefore:

CONTENT=http://customer.com/media/media_file.wmv

CONTENTHASH, SHAREDKEY, AND GMTTIME have the following values, for example:

CONTENTHASH=01101011000101001110001101100010

SHAREDKEY=01101001010011100110101001001011

GMTTIME=01000011001010100111010110100111

The playlist server 108c then calculates:

$$\text{CONTENTKEY}=\text{CONTENTHASH}\otimes\text{SHAREDKEY}\otimes\text{GMTTIME}$$

If the base-64 version of the CONTENTKEY is 'F3G7HPqT5', then this URL is returned in the playlist:

http://customer.com/media/media_file.wmv?ckey=F3G7HPqT5

On the affiliate media server 106b, this base-64 value is turned back into the CONTENTKEY and then the affiliate media server 106b calculates:

$$\text{GMTTIME}=\text{CONTENTKEY}\otimes\text{CONTENTHASH}\otimes\text{SHAREDKEY}$$

Once GMTTIME is obtained, the affiliate media server 106b then determines if it falls within the pre-set threshold of the current time in order to determine whether to return the editorial content to the client system 102.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on one or more computer-usable storage media or devices (for example, CD-ROM, RAM, or magnetic disk). When read into the processor of the computer and executed, the instructions of the program cause the programmable computer to carry out the various operations described above.

A number of implementations have been described. Nevertheless, it will be understood that various modifications may be made. For example, elements of one or more implementations may be combined, deleted, supplemented, or modified to form further implementations. As an example, the implementation of FIG. 10 or 11 may be combined with the implementation of FIG. 9, such that the dynamic URL or the content key are used in conjunction with verifying that the playlist is being followed.

In addition, while implementations have been described that use web-based access to content, other mechanisms may be used. For example, other editorial content delivery mechanisms may additionally or alternately be supported by system 100 or variations of system 100, including video-on-demand (VOD), internet protocol television (IPTV), media center PCs, and mobile streaming media. Similarly, while the above discussion describes a system in which affiliates make their content available on their own website, other implementations may include the affiliates making audio or video content available for end user consumption by, for example, submitting content for search engine indexing, or providing content for viewing by selection on a portal.

Accordingly, other implementations are within the scope of the following claims.

What is claimed is:

1. A method comprising the following operations performed by one or more processors:

receiving, from a client system, a request for media content;

selecting, in response to the request for media content, advertising content based on one or more selection rules;

generating a playlist, the playlist including at least a first identifier and a second identifier, the first identifier identifying the selected advertising content, and the second identifier identifying the media content;

determining whether the advertising content is presented on the client system within a predetermined time period;

providing access to the media content associated with the second identifier when the advertising content is determined to be presented within a first predetermined time period; and preventing access to the media content associated with the second identifier when the advertising content is not determined to be presented within the first predetermined time period.

2. The method of claim 1, further comprising:

receiving, from the client system, an audit message indicating a behavior of the client system when the advertising content or the media content is being presented.

3. The method of claim 2, further comprising:

updating the one or more selection rules at least partially based on the audit message.

4. The method of claim 1, further comprising:

receiving, from the client system, a status message indicating a time that the advertising content was presenting on the client system.

5. The method of claim 1, wherein the request for the media content comprises at least one of an identification of the client system or an identification of a host of the media content.

6. The method of claim 1, wherein the request for the media content comprises a uniform source locator for the media content.

7. The method of claim 1, further comprising:

determining a category of the requested media content, wherein the one or more selection rules are provided at least partially based on the category of the media content.

8. The method of claim 1, wherein the one or more selection rules are provided at least partially based on a number of client systems requesting the media content within a second predetermined time period.

9. The method of claim 1, wherein the one or more selection rules are provided at least partially based on a geographic location of the client system.

10. A system of providing access to media content, comprising:

a memory that stores instructions; and one or more processors that are configured to execute the instructions to cause the system to:

receive, from a client system, a request for media content;

select, in response to the request for media content, advertising content based on the one or more selection rules;

generate a playlist, the playlist including at least a first identifier and a second identifier, the first identifier identifying the selected advertising content, and the second identifier identifying the media content;

determine whether the advertising content is presented on the client system within a predetermined time period;

provide access to the media content associated with the second identifier when the advertising content is determined to be presented within a first predetermined time period; and prevent access to the media content associated with the second identifier when the advertising content is not determined to be presented within the first predetermined time period.

11. The system of claim 10, wherein the instructions are further executed by the one or more processors to:

receive, from the client system, an audit message indicating a behavior of the client system when the advertising content or the media content is being presented.

12. The system of claim 11, wherein the instructions are further executed by the one or more processors to:

update the one or more selection rules at least partially based on the audit message.

13. The system of claim 10, wherein the instructions are further executed by the one or more processors to:

receive, from the client system, a status message indicating a time that the advertising content was presenting on the client system.

14. The system of claim 10, wherein the request for the media content comprises at least one of an identification of the client system or an identification of a host of the media content.

15. The system of claim 10, wherein the request for the media content comprises a uniform source locator for the media content.

16. The system of claim 10, wherein the instructions are further executed by the one or more processors to:

determine a category of the requested media content, wherein the one or more rules for advertising content selection are provided at least partially based on the category of the media content.

17. The system of claim 10, wherein the one or more selection rules are provided at least partially based on a number of client systems requesting the media content within a second predetermined time period.

18. The system of claim 10, wherein the one or more selection rules are provided at least partially based on a geographic location of the client system.

19. A non-transitory computer readable medium embodying a computer program product, the computer program product comprising instructions configured to cause a computing device to perform the following operations:

receiving, from a client system, a request for media content;

selecting, in response to the request for media content, advertising content based on the one or more selection rules;

generating a playlist, the playlist including at least a first identifier and a second identifier, the first identifier identifying the selected advertising content, and the second identifier identifying the media content;

determining whether the advertising content is presented on the client system within a predetermined time period;

providing access to the media content associated with the second identifier when the advertising content is determined to be presented within a first predetermined time period; and preventing access to the media content associated with the second identifier when the advertising content is not determined to be presented within the first predetermined time period.

20. The non-transitory computer readable medium of claim 19, wherein the method comprising:

receiving, from the client system, an audit message indicating a behavior of the client system when the advertising content or the media content is being presented; and updating the one or more selection rules at least partially based on the audit message.

* * * * *